(12) United States Patent
Auyeung et al.

(10) Patent No.: US 12,058,321 B2
(45) Date of Patent: Aug. 6, 2024

(54) METHOD AND APPARATUS FOR VIDEO CODING

(71) Applicant: TENCENT AMERICA LLC, Palo Alto, CA (US)

(72) Inventors: Cheung Auyeung, Sunnyvale, CA (US); Zhongzheng Yuan, Brooklyn, NY (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 220 days.

(21) Appl. No.: 17/447,806

(22) Filed: Sep. 15, 2021

(65) Prior Publication Data

US 2022/0191482 A1    Jun. 16, 2022

Related U.S. Application Data

(60) Provisional application No. 63/126,186, filed on Dec. 16, 2020.

(51) Int. Cl.
*H04N 19/117* (2014.01)
*G06N 3/02* (2006.01)
(Continued)

(52) U.S. Cl.
CPC ............ *H04N 19/117* (2014.11); *G06N 3/02* (2013.01); *H04N 19/105* (2014.11); *H04N 19/176* (2014.11); *H04N 19/82* (2014.11)

(58) Field of Classification Search
CPC .......... G06N 3/02; G06N 3/045; G06N 3/048; G06N 3/08; G06N 3/04; G06N 3/049;
(Continued)

(56) References Cited

U.S. PATENT DOCUMENTS

2019/0246102 A1\*  8/2019  Cho ................... G06N 3/045
2020/0296364 A1\*  9/2020  Rusanovskyy ...... H04N 19/176
(Continued)

FOREIGN PATENT DOCUMENTS

WO   WO2020/092532 A1   5/2020
WO   WO2020/242057 A1   12/2020

OTHER PUBLICATIONS

Shazeer et al.—"Outrageously Large Neural Networks: The Sparsely-Gated Mixture-Of-Experts Layer", under review as a conference paper at ICLR 2017, Jan. 23, 2017 (19 pages).
(Continued)

*Primary Examiner* — Masum Billah
(74) *Attorney, Agent, or Firm* — ARENTFOX SCHIFF LLP

(57) ABSTRACT

Aspects of the disclosure provide methods and apparatuses for video processing. In some examples, an apparatus for video processing includes processing circuitry. The processing circuitry determines gating weights associated with expert modules based at least partially on a quantization parameter (QP) value. The expert modules are configured to process an input block that includes an image block being reconstructed based on the QP value. The processing circuitry then weights the expert modules based on the gating weights to generate an output image block corresponding to the image block.

20 Claims, 20 Drawing Sheets

(51) Int. Cl.
*H04N 19/105* (2014.01)
*H04N 19/176* (2014.01)
*H04N 19/82* (2014.01)

(58) Field of Classification Search
CPC ........ G06N 20/10; G06N 3/008; G06N 3/047; H04N 19/105
USPC .......................................................... 375/240
See application file for complete search history.

(56) References Cited

U.S. PATENT DOCUMENTS

2022/0036155 A1* 2/2022 Guevara ................ G06N 3/063
2023/0050660 A1* 2/2023 Bankoski ............. H04N 19/136

OTHER PUBLICATIONS

Brass et al.—"Versatile Video Coding (Draft B)", Joint Video Experts Team (JVET) of ITU-T SG 16 WP 3 and ISO/IEC JTC 1/SC 29/WG 11, 17th Meeting: Brussels, BE, Jan. 7-17, 2020, Document: NVET-Q2001-vE (510 pages).
Chen et al.—"Algorithm description for Versatile Video Coding and Test Model 8 (VTM 8)" Joint Video Experts Team (JVET) of ITU-T SG 16 WP 3 and ISO/IEC JTC 1/SC 28/WG 11, $17^{th}$ Meeting: Brussels, BE, Jan. 7-17, 2020, Document: JVET-Q2002-v3 (99 pages).
Supplementary European Search Report in 21907387.1, mailed Dec. 14, 2022, 9 pages.
Choi Ouk et al: "Yet Another Cost Aggregation Over Models", IEEE Transactions on Image Processing, IEEE, USA, vol. 25, No. 11, Nov. 1, 2016, pp. 5397-5410.
Jens-Rainer Ohm et al: "Developments and Trends in 2D and 3D Video Coding Standardization: HEVC and More", Tutorial ICIP 2012, Sep. 30, 2012, pp. 1-87.
Robert A. Jacobs et al: "Adaptive Mixtures of Local Experts", Neural Computation., vol. 3, No. 1, Feb. 1, 1991, pp. 79-87.
Yuksel SE et al: "Twenty Years of Mixture of Experts", IEEE Transactions on Neural Networks and Learning Systems, IEEE, USA, vol. 23, No. 8, Aug. 1, 2012 (Aug. 1, 2012), pp. 1177-1193.
International Search Report and Written Opinion issued in application PCT/US2021/052049 on Jan. 20, 2022, (13 pages).

* cited by examiner

METHOD AND APPARATUS FOR VIDEO CODING

INCORPORATION BY REFERENCE

This present application claims the benefit of priority to U.S. Provisional Application No. 63/126,186, "A QUANTIZATION PARAMETER ADAPTIVE MIXTURE-OF-EXPERT FILTER FOR VIDEO PROCESSING" filed on Dec. 16, 2020, which is incorporated by reference herein in its entirety.

TECHNICAL FIELD

The present disclosure describes embodiments generally related to video processing. More specifically, the present disclosure provides neural network processing techniques for improving picture quality in video codec.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs. and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video processing. In some examples, an apparatus for video processing includes processing circuitry. The processing circuitry determines gating weights associated with expert modules based at least partially on a quantization parameter (QP) value. The expert modules are configured to process an input block that includes an image block being reconstructed based on the QP value. The processing circuitry then weights the expert modules based on the gating weights to generate an output image block corresponding to the image block.

In some examples, the processing circuitry combines module outputs from the expert modules based on the gating weights to generate the output image block corresponding the image block.

In some examples, the processing circuitry determines a combined expert module that combines the expert modules based on the gating weights.

In some examples, the processing circuitry determines the gating weights based on the quantization parameter and the input block that includes the image block and neighboring pixels of the image block.

In some examples, the processing circuitry determines the gating weights using at least a convolution neural network layer.

In some examples, the processing circuitry activates a subset of expert modules with non zero gating weights, and combines the module outputs of the subset of expert modules based on the gating weights associated with the subset of expert modules to generate the output image block corresponding to the image block.

In some examples, an expert module is implemented with a convolution neural network, can a module output in response to the input block that includes the image block.

In some examples, the expert modules are finite impulse response (FIR) filters, and the processing circuitry can determine a combined FIR filter that combines the FIR filters based on the gating weights and apply the combined FIR filter on the input block that includes the image block to generate the output image block.

In some examples, the processing circuitry determines the gating weights in a deterministic manner, and the output image block is generated in a loop associated with reference pictures.

In some examples, the processing circuitry determines the gating weights in a non deterministic manner, and the output image block is generated out of a loop associated with reference pictures.

Aspects of the disclosure also provide a non-transitory computer-readable medium storing instructions which when executed by a computer cause the computer to perform the method for video processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1A:
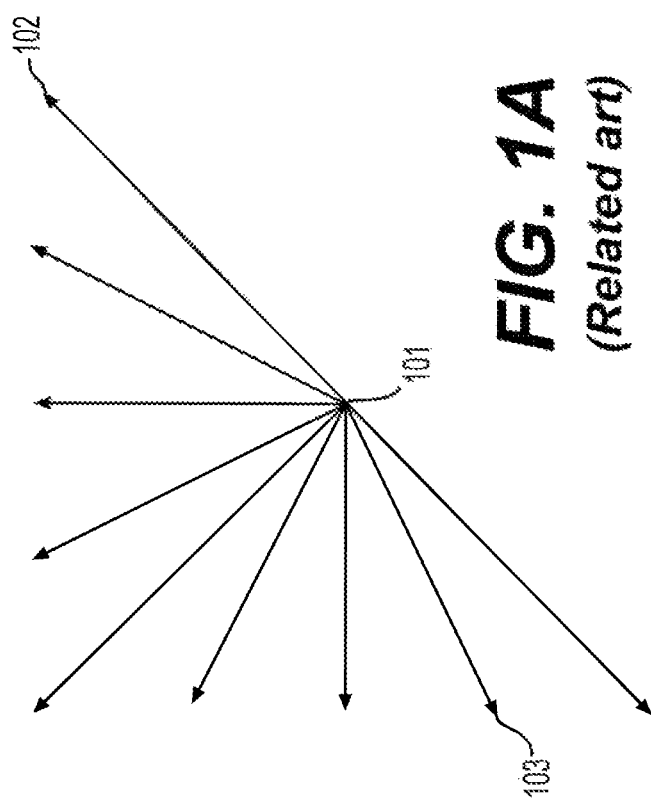
FIG. 1A is a schematic illustration of an exemplary subset of intra prediction modes.
Figure 1A:
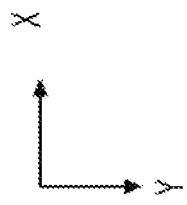
Figure 1B:
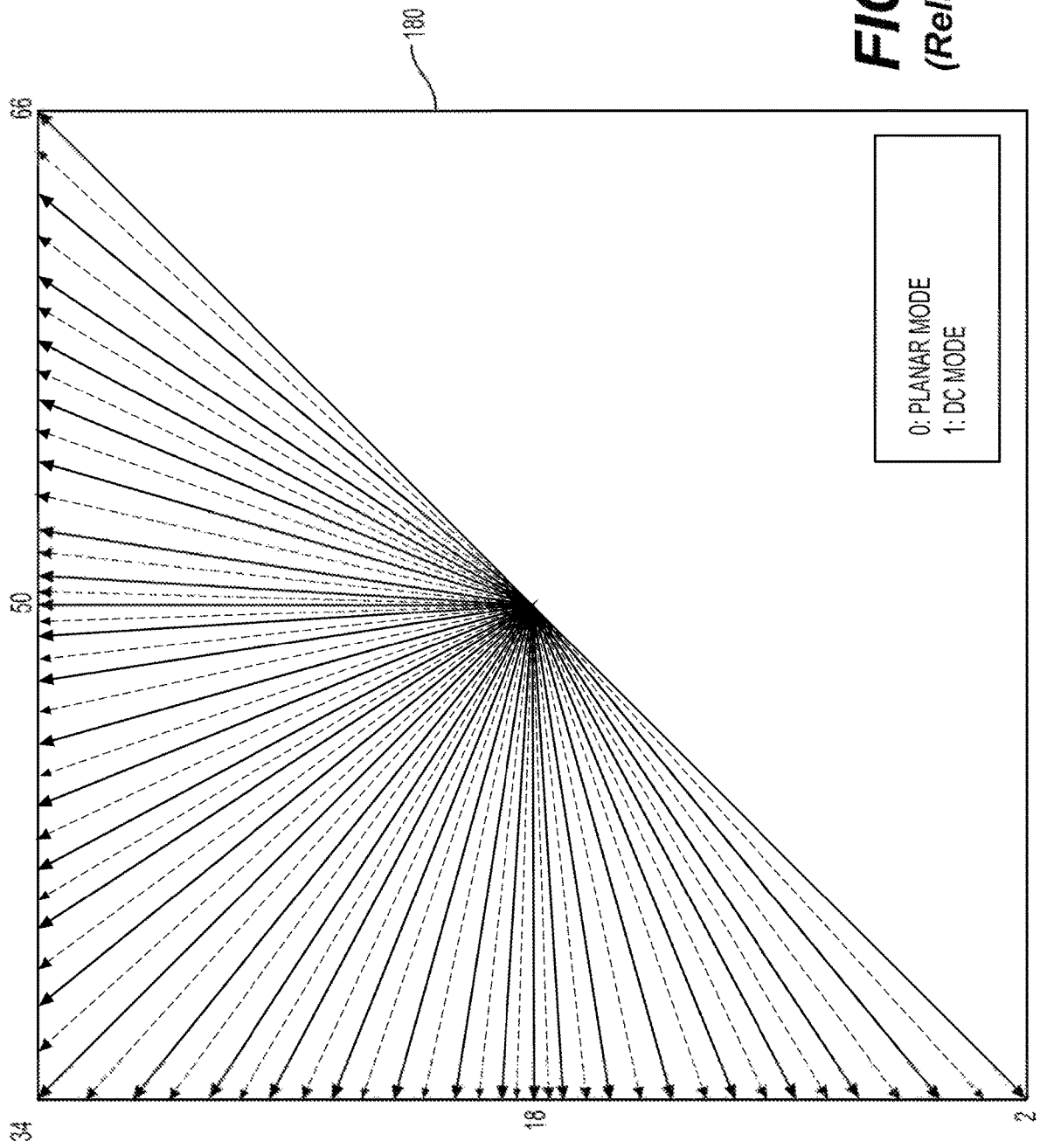
FIG. 1B is an illustration of exemplary intra prediction directions.
Figure 2:
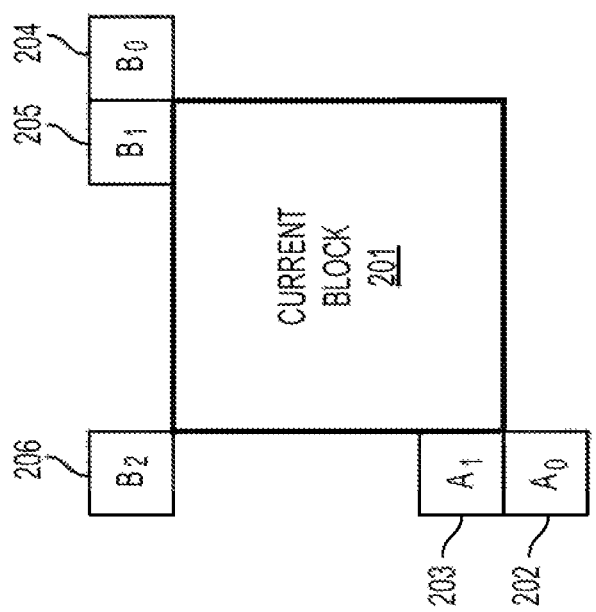
FIG. 2 is a schematic illustration of a current block and its surrounding spatial merge candidates in one example.
Figure 3:
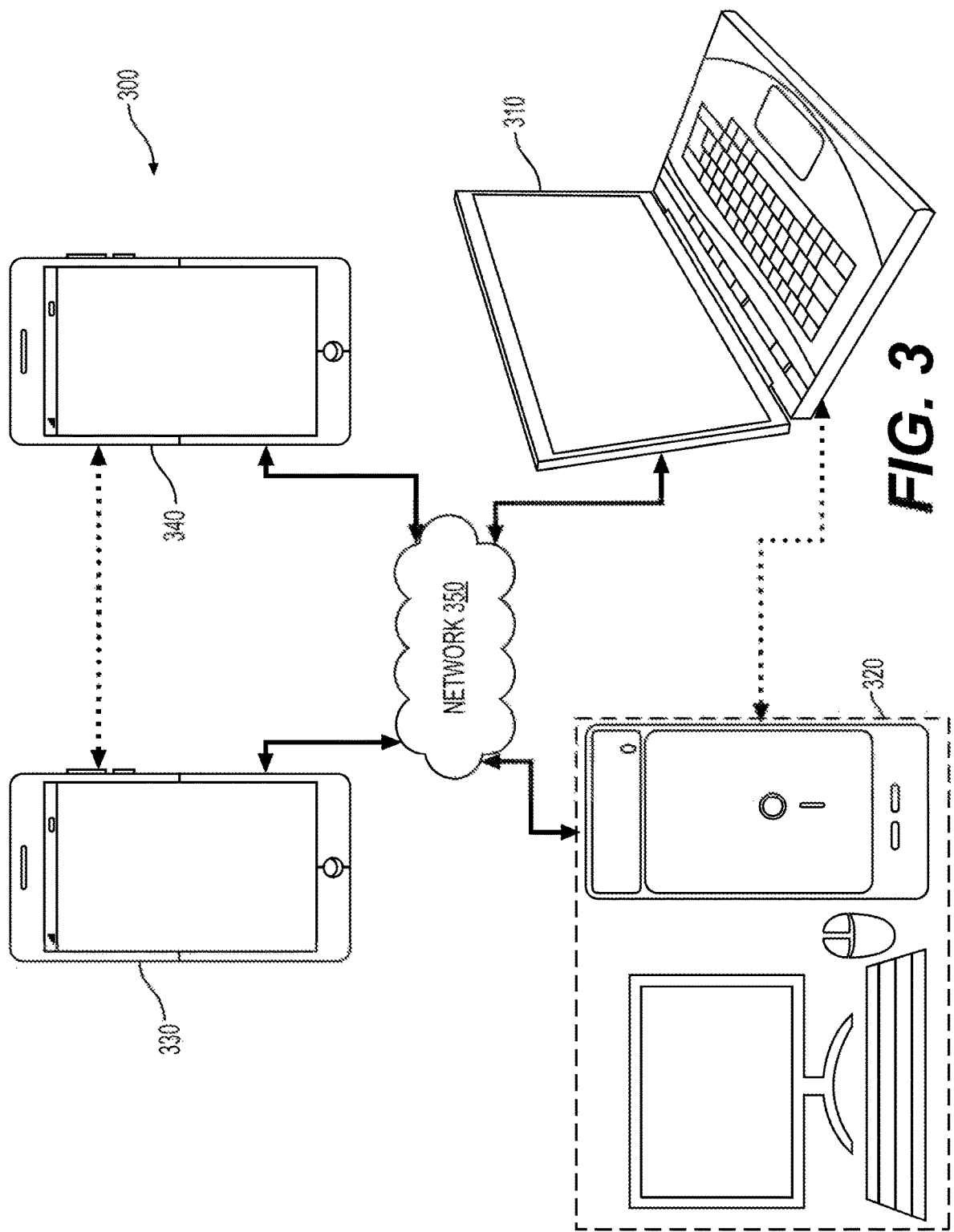
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
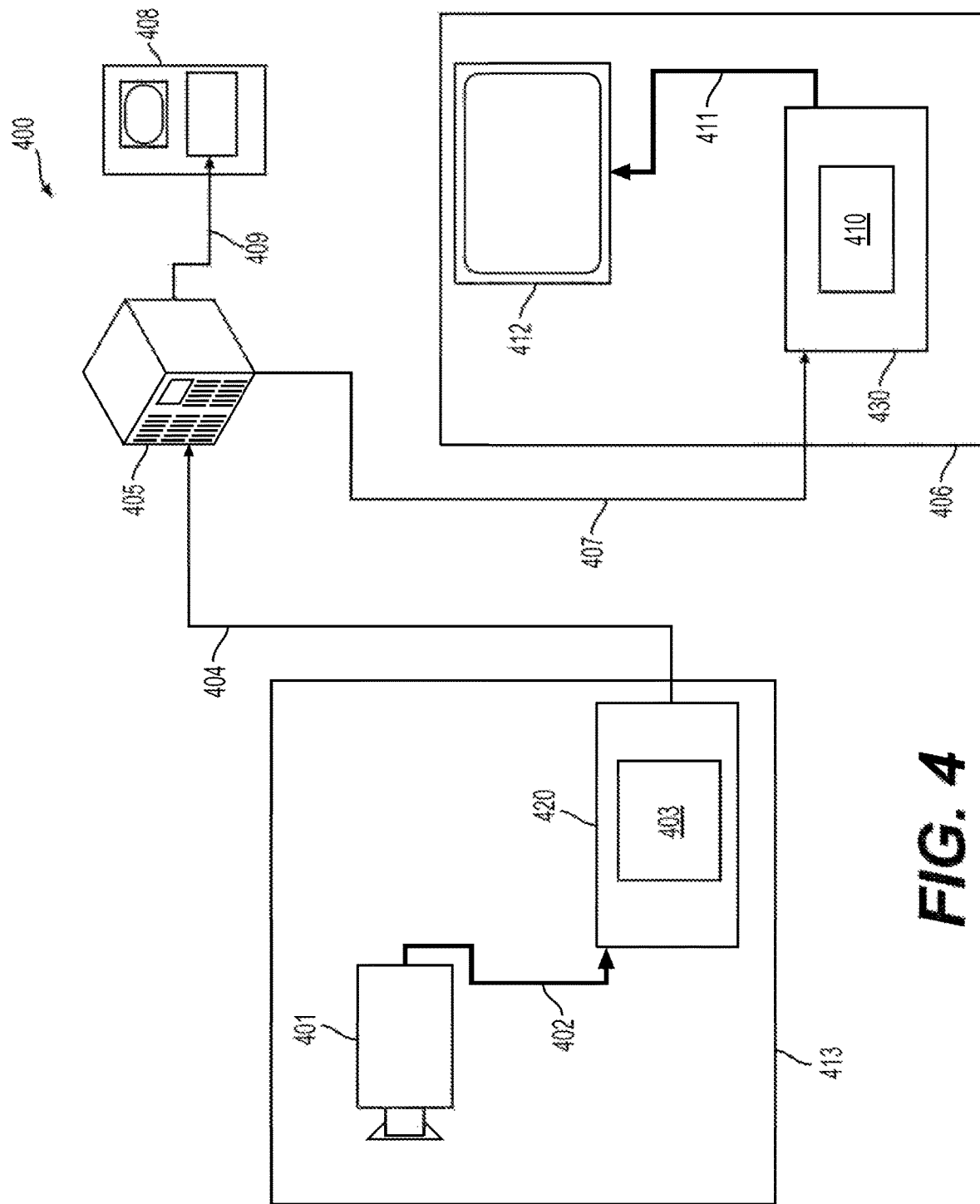
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
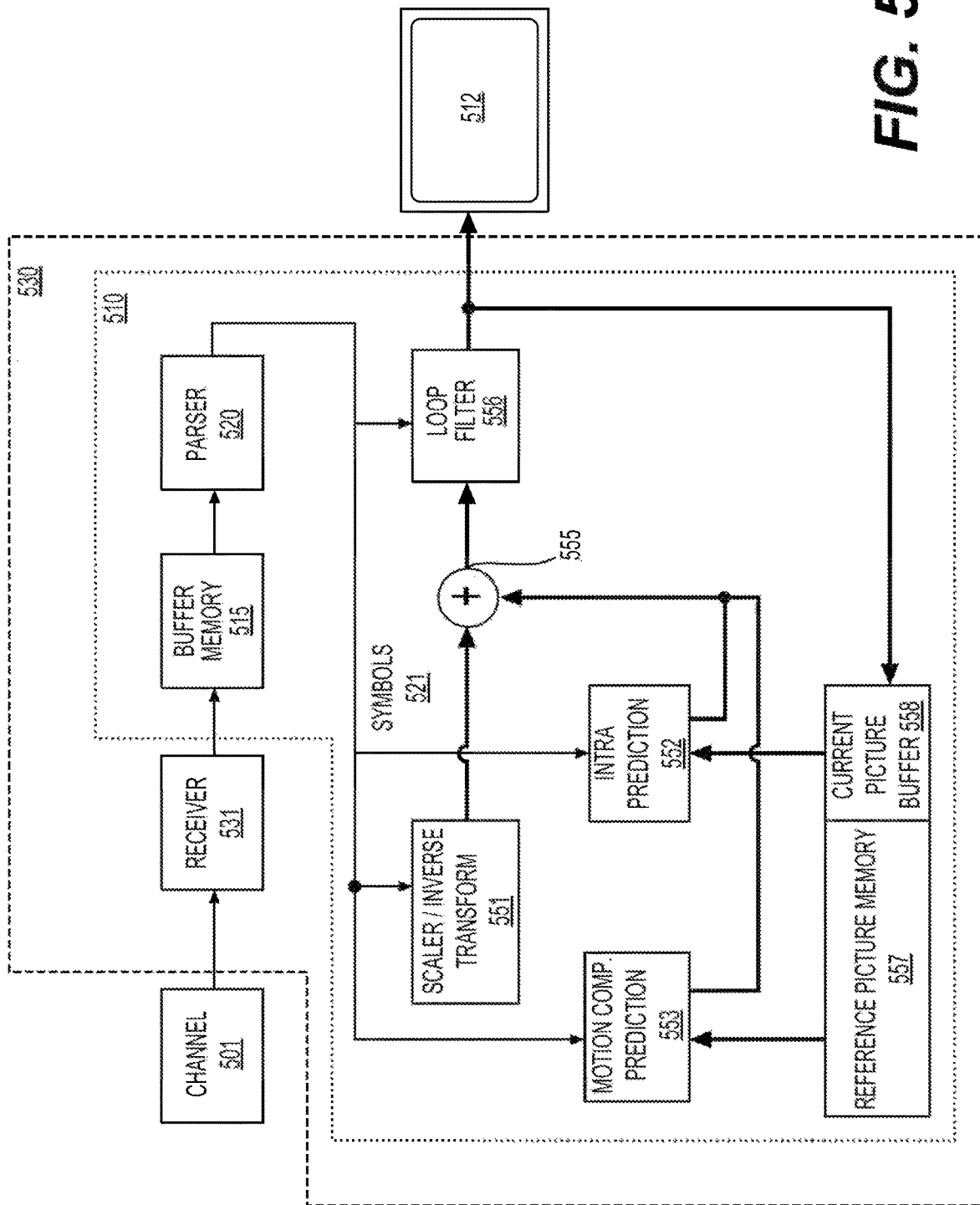
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" hence-forth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512)(e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler 1 inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
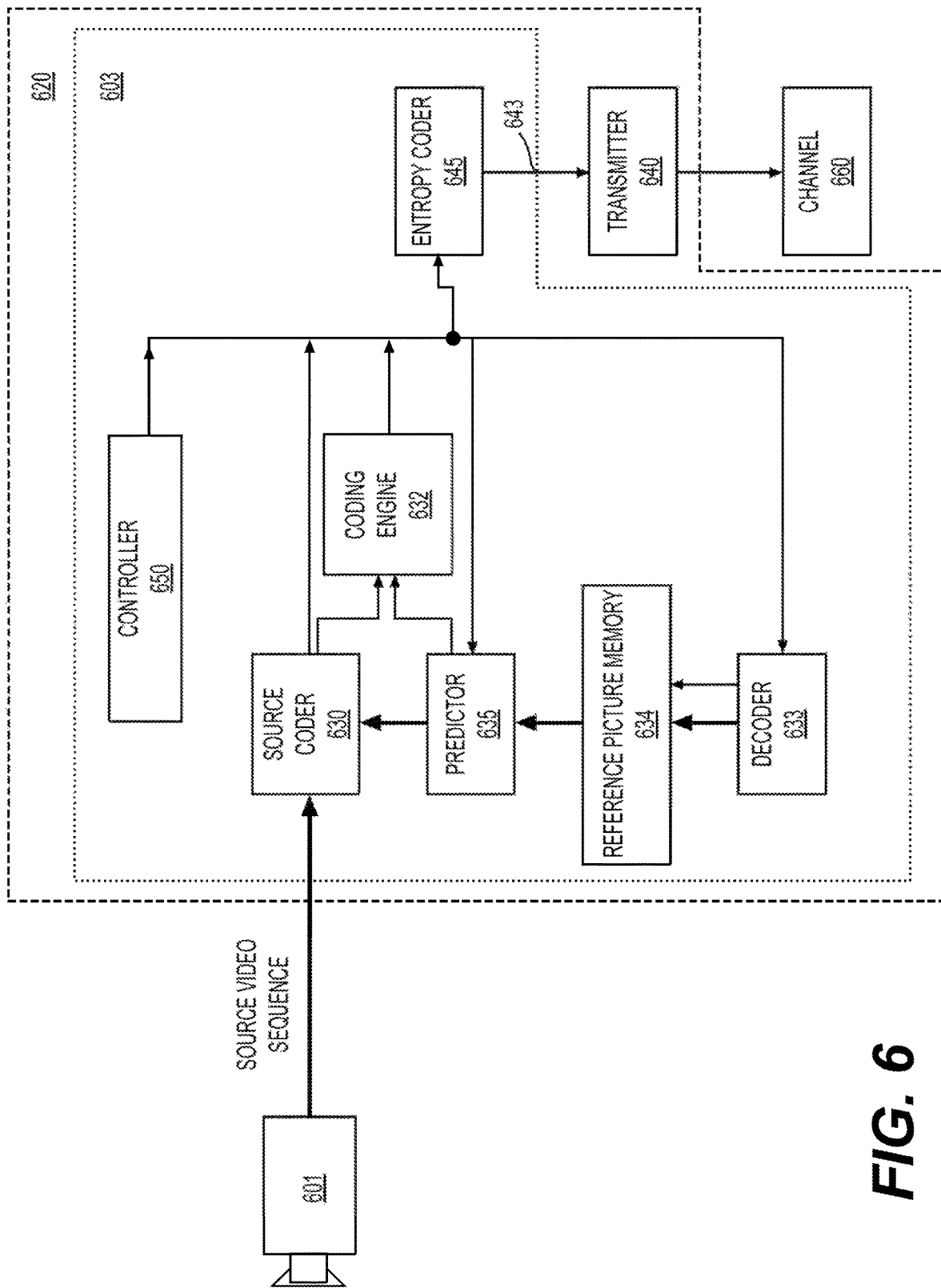
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640)(e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any color space (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CJs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
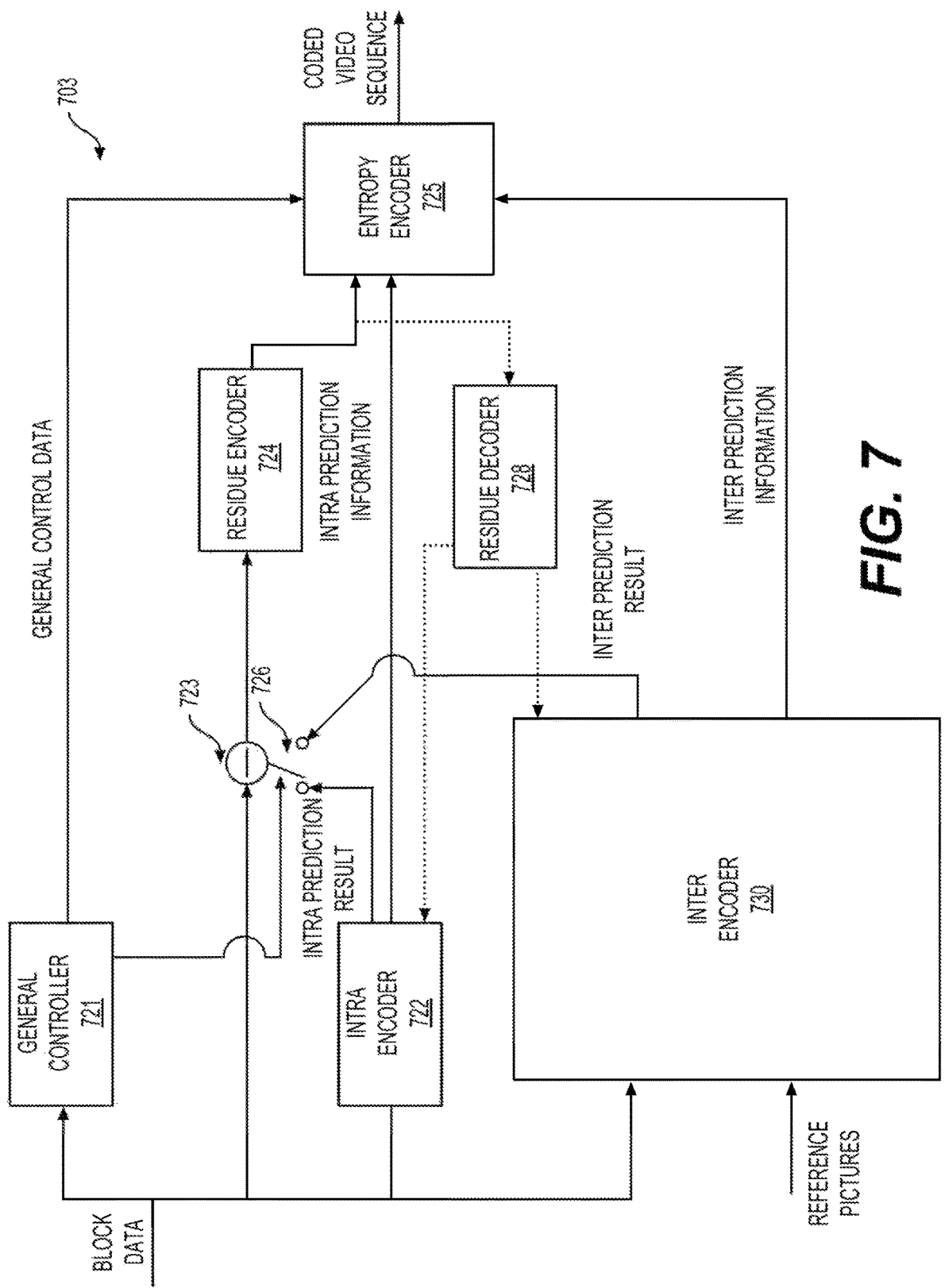
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
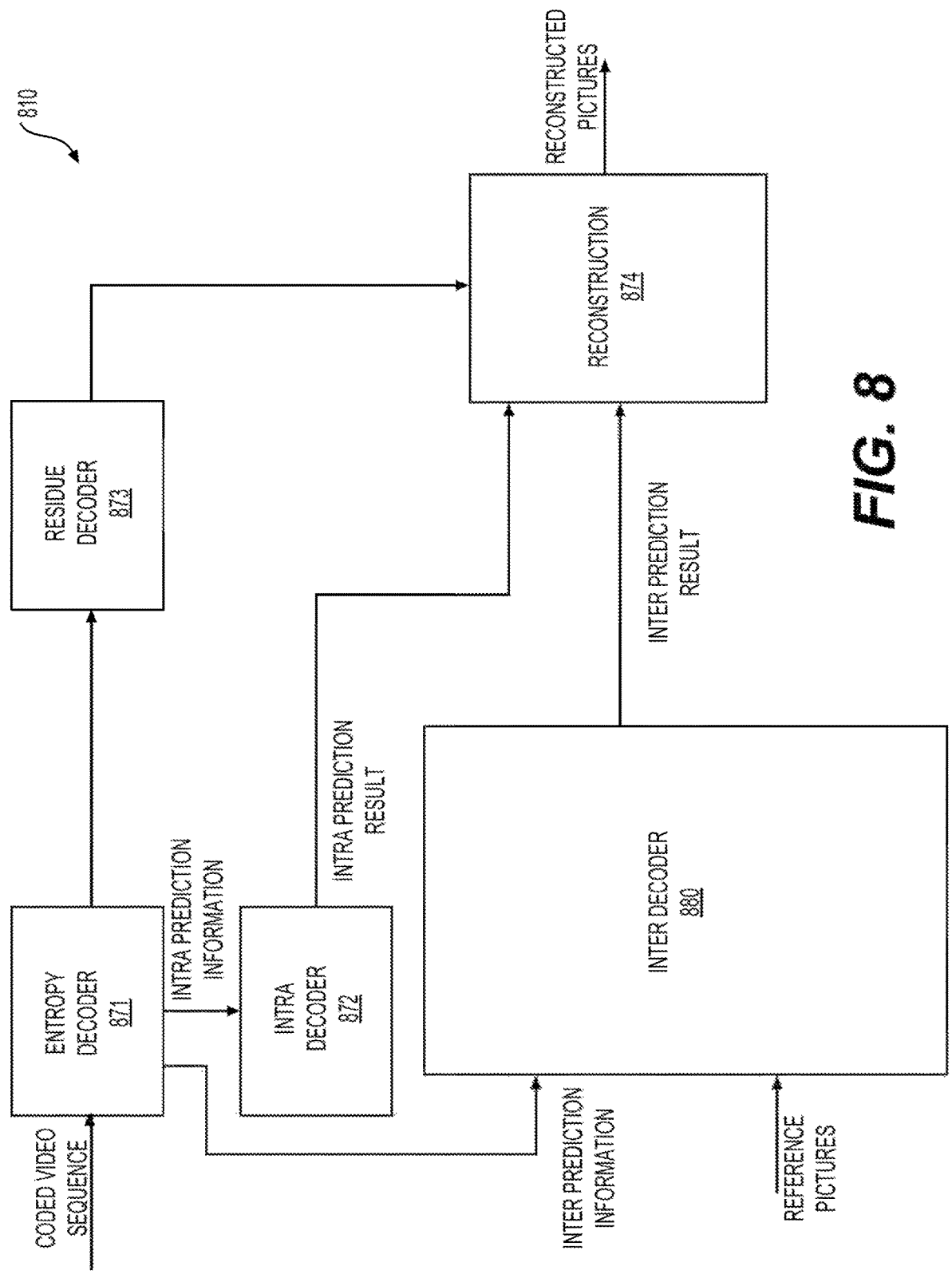
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880) respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Neural network technology can be used with video coding technology, and the video coding technology with neural network can be referred to as hybrid video coding technology. Some aspects of the present disclosure provide techniques of adaptive filtering in hybrid video coding technologies for improving picture quality using neural network. Specifically, according to some aspects of the disclosure, techniques of adaptive mixture of expert filtering can be used in video coding to enhance video quality. In some examples, adaptive filtering in hybrid video coding technologies can use mixture of expert network that are controlled based on quantization parameter for improving picture quality. The adaptive filtering techniques can be used in in loop filters as well as filters in post processing.

According to an aspect of the disclosure, in loop filters are filters that influence the reference data. Filters in post processing do not influence the reference data. For example, the filtered image by the loop filter unit (556) is stored in a buffer, such as the reference picture memory (557) as a reference for further prediction. In some examples, the filtered image can be further processed by a post processing unit (not shown) in FIG. 5. The post processing unit does not affect the stored filtered image. The post processing unit may include filters.

Figure 9:
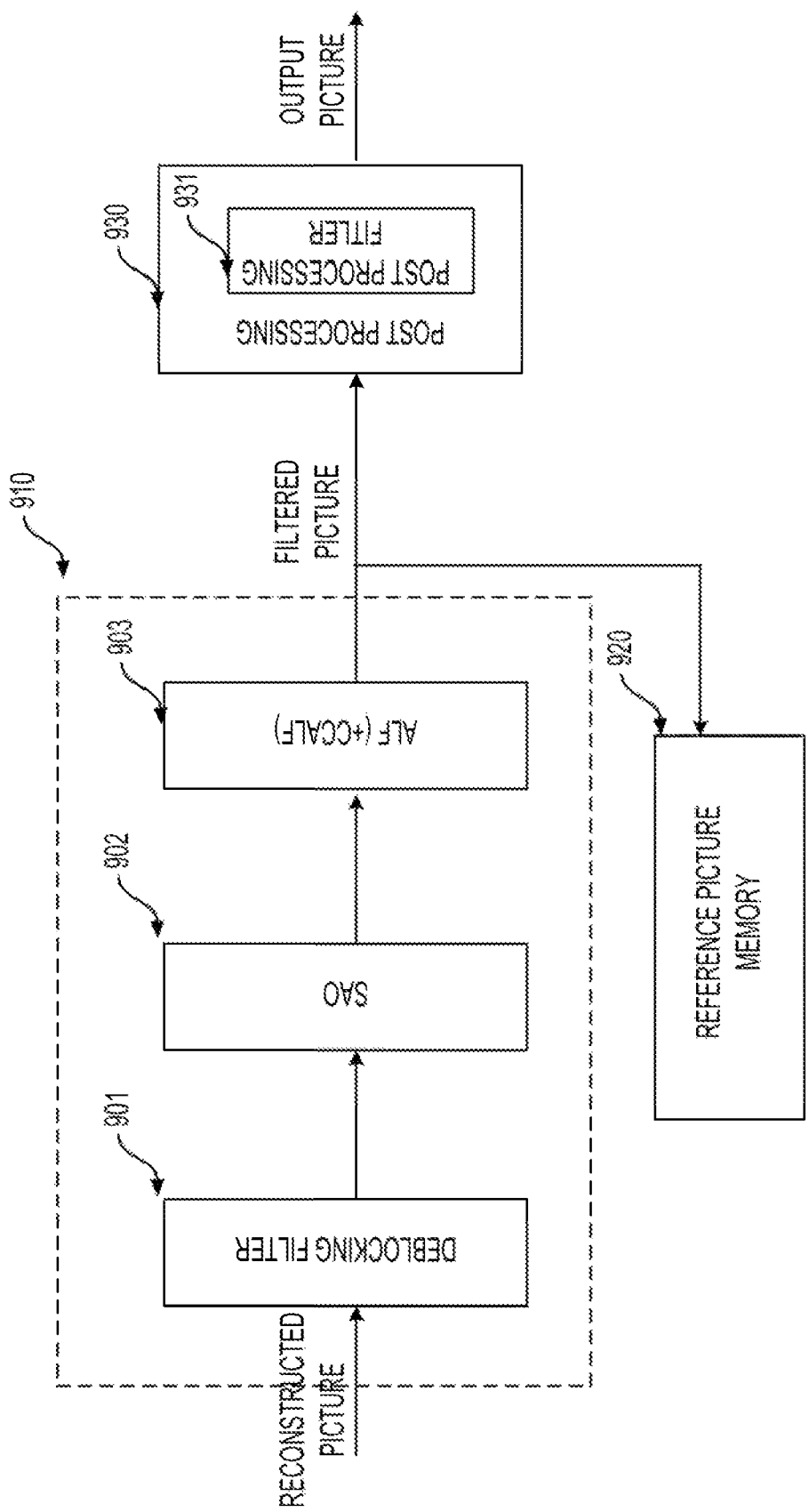
FIG. 9 shows a block diagram of a loop filter unit in some examples.

FIG. 9 shows a block diagram of a loop filter unit (910) in some examples. The loop filter unit (910) can be used in the place of the loop filter unit (556) in an example. In the FIG. 9 example, the loop filter unit (910) includes a deblocking filter (901), a sample adaptive offset (SAO) filter (902), and an adaptive loop filter (ALF) filter (903). In some examples, the ALF filter (903) can include cross component adaptive loop filter (CCALF).

During operation, in an example, the loop filter unit (910) receives a reconstructed picture, applies various filters on the reconstructed picture and generates a filtered picture in response to the reconstructed picture. The filtered picture can be stored, for example, in a reference picture memory (920) as a reference picture for further decoding. The filtered picture can be further processed by a post processing unit (930) at the decoder side to generate an output picture as a decoder output. In some examples, the post processing unit (930) can include a post processing filter (931) that does not influence the reference picture.

In some examples, the deblocking filter (901) and the SAO filter (902) are configured to remove blocking artifacts that are introduced when block coding techniques are used. The deblocking filter (901) can smooth shape edges that are formed when block coding techniques are used. The SAO filter (902) can apply specific offsets to samples in order to reduce distortion relative to other samples in a video frame. The ALF filter (903) can apply a classification to, for example, a block of samples, and then apply a filter associated with the classification on the block of samples. The filter coefficients of the filter can be determined by the encoder and signaled to the decoder in some examples.

Aspects of the disclosure provide adaptive filtering techniques in hybrid video coding technologies for improving picture quality. In some examples, an adaptive mixture of expert network is used in an adaptive loop filter, such as the ALF filter (903). In some examples, an adaptive mixture of expert network is used in a post processing filter, such as the post processing filter (931). In some embodiments, an adaptive mixture of expert network can receive a neighboring block that includes an image block and neighboring pixels of the image block, and can receive a quantization parameter (QP) value that was used to reconstruct the image block. The adaptive mixture of the expert network can generate an output image block with improved quality based on the QP value.

In some video coding examples (e.g., VVC standard), block based adaptive filters can be used in video coding. For example, a block based adaptive filter can be used as an in loop filter that can be referred to as block based adaptive loop filter (BALF). In some examples, BALF is an in loop filter which can adaptively switch finite impulse response (FIR) filters at a block level (e.g., a block of 4×4 pixels that is also referred to as 4×4 block) to improve video quality of blocks. Specifically, in some examples, BALF can be performed in two steps. In a first step of BALF, a block, such as a 4×4 block is classified as a class from a group of classes (e.g., a maximum of 100 classes) based on a neighborhood of the block, such as a 10×10 neighboring block of the 4×4 block (e.g., the 4×4 block is at the center portion of the 10×10 neighboring block). Then, in a second step of BALF, based on the classification of the 4×4 block, a FIR filter is selected from a group of FIR filters to filter the 10×10 neighboring block to obtain a filtered 4×4 block as an output image block.

In some examples, the group of FIR filter can be predefined, and the filter coefficients of the selected filter are available by both the encoder and the decoder. In some other examples, the filter coefficients of the selected FIR filter are computed by the encoder, such as in the examples of Weiner filters. When the filter coefficients of the selected FIR filter are computed by the encoder, the filter coefficients are encoded in the coded video bitstream, the coded video bitstream is transmitted to the decoder to signal the filter coefficients of the selected FIR filter to the decoder.

In some examples, when the filter coefficients are computed by the encoder, the encoder can determine the number of classes and the corresponding filter coefficients to achieve a fine balance between picture distortion and the number of bits to encode the corresponding filter coefficients. In general, more classes can result in lower distortion but can increase the number of bits to encode the filter coefficients.

Some aspects of the disclosure provide techniques to use sparsely gated mixture of experts (MoE) network in filters for video coding. A MoE network is a network architecture that uses a number of expert modules s to process input data and uses a gating network to conditionally select a subset of the expert modules and use the corresponding weightings to compute an output.

Figure 10:
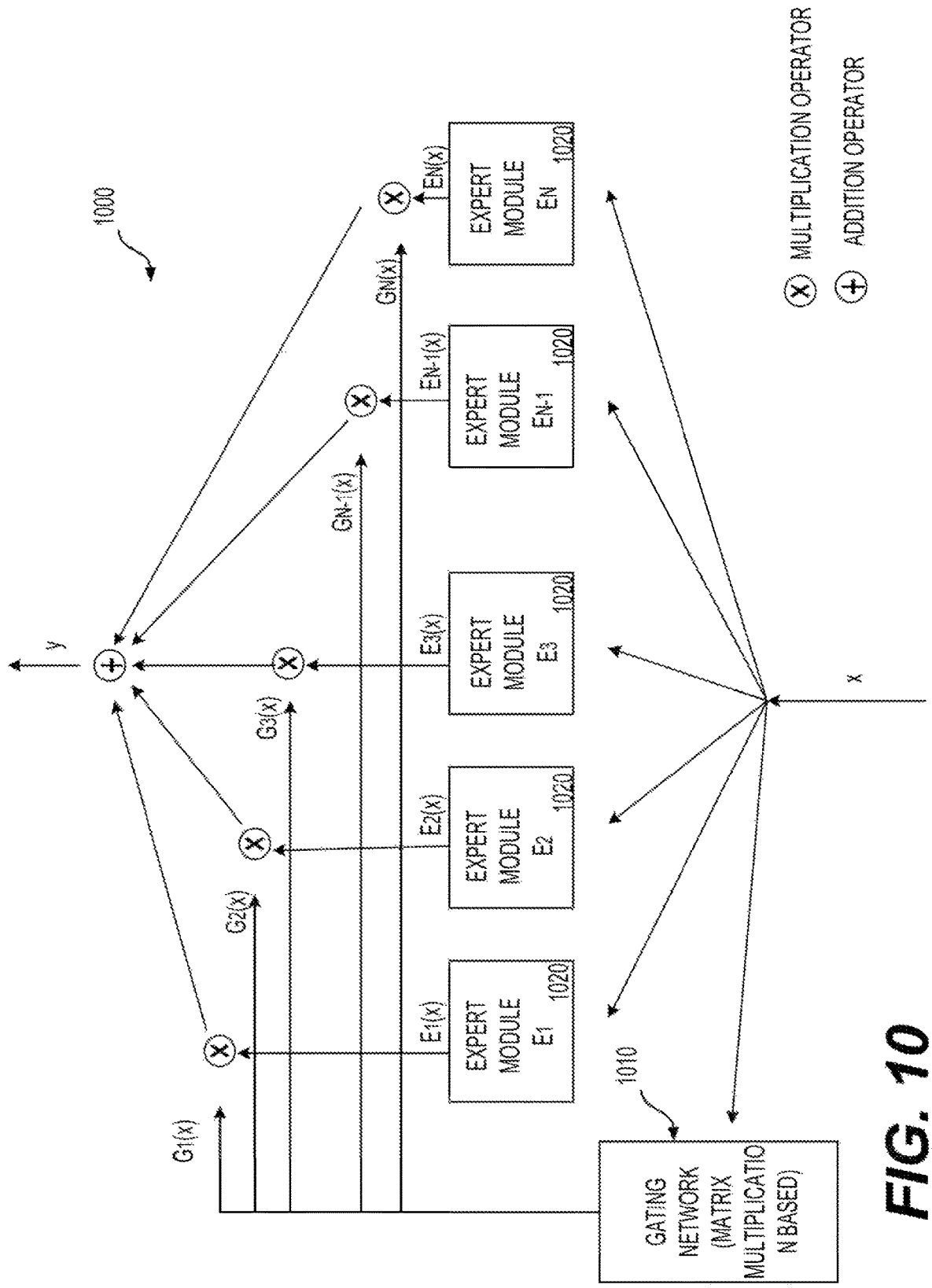
FIG. 10 shows an example of a sparsely gated mixture of experts (MoE) network.

FIG. 10 shows an example of a MoE network (1000). The MoE network (1000) includes a gating network (1010) and a plurality of expert modules (1020) shown by $E_1$-$E_N$, where N is the number of expert modules, and is a positive integer. The expert modules $E_1$-$E_N$ can have different parameters or different functions. The MoE network (1000) receives an input signal x, and generate an output signal y. The input signal x is provided to the gating network (1010) and a plurality of expert modules (1020). The gating network (1010) generates gating weights $G_1(x)$-$G_N(x)$ respectively for the expert modules $E_1$-$E_N$ based on the input signal x. The expert modules $E_1$-$E_N$ can respectively generate module outputs (shown by $E_1(x)$-$E_N(x)$) based on the input signal x. The output y is a weighted combination of the module outputs $E_1(x)$-$E_N(x)$ based on the gating weights $G_1(x)$-$G_N(x)$.

Figure 11:
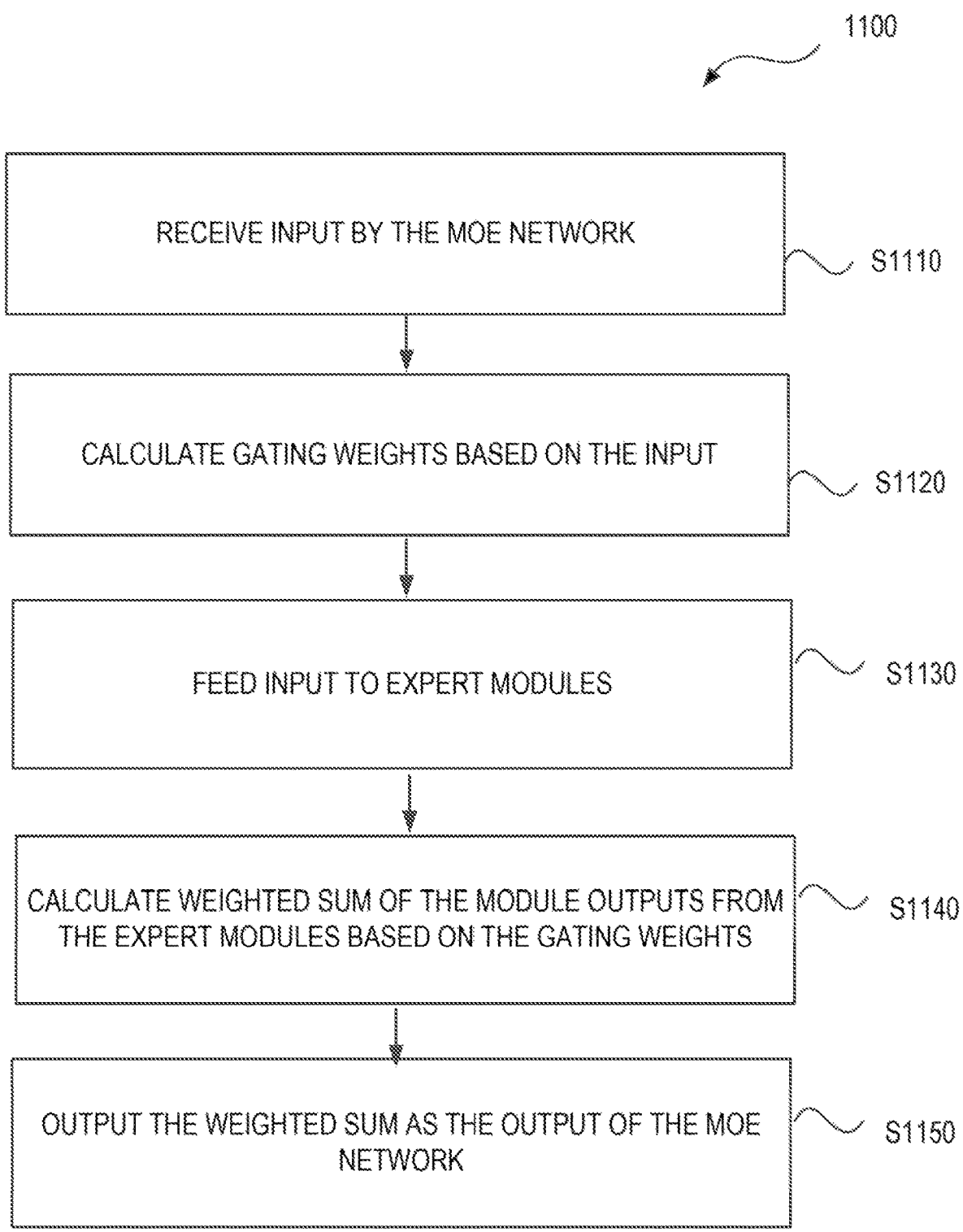
FIG. 11 shows a flow chart outlining a process of data processing by a MoE network.

FIG. 11 shows a flow chart outlining a process (1100) of data processing by a MoE network, such as the MoE network (1000).

At (S1110), the MoE network (1000) receives an input signal x.

At (S1120), the gating network (1010) calculates respective gating weights for the expert modules $E_1$-$E_N$ based on the input signal x.

At (S1130), the input signal x is feed respectively to the expert modules $E_1$-$E_N$, and the expert modules $E_1$-$E_N$ respectively generates module outputs $E_1(x)$-$E_N(x)$ based on the input signal x.

At (S1140), a weighted sum of the module outputs from the expert modules is calculated based on the gating weights. It noted when a gating weight for an expert module is zero, the expert module is gated, and the module output is not included in the output.

At (S1150), the weighted sum is output as the output signal y of the MoE network (1000).

In some examples, the MoE network (1000) and the process (1100) are used in language modeling and machine translation, the gating weights can be determined based on matrix multiplication. For example, a vector G(x) including N gating weights (e.g., $G_1(x)$-$G_N(x)$ in FIG. 10, N is the number of expert modules) can be generated according to Eq. (1)-Eq. (3):

$$H(x)_i = (x \cdot W_g) + StandardNormal(\ ) \cdot Softplus((x \cdot W_{noise})_i) \quad \text{Eq. (1)}$$

$$G(x) = Softmax(KeepTopK((H(x), k)) \quad \text{Eq. (2)}$$

$$KeepTopK(v, k)_i = \begin{cases} v_i & \text{if } v_i \text{ is in the top } k \text{ elements of } v. \\ -\infty & \text{otherwise.} \end{cases} \quad \text{Eq. (3)}$$

where H(x) is a vector with elements $H(x)_i$ calculated based on Eq. (1); Softmax( ) is a normalized exponential function that generates an output vector and ensures that a sum of components in the output vector is 1; Softplus( ) is a smooth approximation to the ReLu function, and in an example $f(x) = ln(1+e^x)$ can be referred to as Softplus function; StandardNormal( ) is a random number generator that generates a random number based on Gaussian distribution with zero mean and unit variance; KeepTopK( ) is used to keep the top k values, and set the rest to $-\infty$ (will be zero after Softmax( ) is applied); $W_g$ and $W_{noise}$ are trainable weight matrix; k is the number of non-zero elements in the vector G(x).

It is noted that, in some examples, KeepTopK( ) function can cause k (k is smaller than N) gating weights to be non zero and the rest of the gating weights to be zero, and can create sparsity to save computation.

In an example, when a gating weight $G_i(x)$ is non-zero, the corresponding expert module $E_i$ is activated to generate a module output $E_i(x)$. When an expert module generates a module output, the module output is weighted based on the corresponding gating weight. The weighted module outputs can be combined to generate a final output for the MoE network. In some example, the final output of the MoE network can be calculated according to Eq. (4):

$$y = \Sigma_{i=1}^N G_i(x) E_i(x) \quad \text{Eq. (4)}$$

Some aspects of the disclosure provide techniques to use MoE network in adaptive filtering to balance of distortion and rate in video codec. In the following description, an adaptive filter that uses MoE network can be referred to an adaptive MoE filter. In some examples, an adaptive MoE filter can be used in the place of a BALF, and the adaptive MoE filter can increase the number of distinct filters that can be used for filtering to more than million filters without encoding the filter coefficients in the coded video bitstream.

In some other examples, an adaptive MoE filer can be used in post processing, such as used in the place of the post processing filter (931).

In some examples, the adaptive MoE filter can operate in a similar manner as a block-based adaptive loop filter (BALF). Specifically, the adaptive MoE filter can switch a FIR filter at M1×M2 block, where, for example, M1=M2=4 as in VVC. Then, the adaptive MoE filter can take a N1×N2 neighboring block of the M1×M2 block as an input image block, where, for example N1=N2=10 as in VVC, and the M1×M2 block can be the center portion of the N1×N2 neighboring block. Then, the adaptive MoE filter can generate an M1×M2 filtered output image block.

According to an aspect of the disclosure, unlike the BALF, the adaptive MoE filter does not classify the M1×M2 block based on the N1×N2 neighborhood. Instead, in some examples, the adaptive MoE filter receives the N1×N2 neighboring block of the M1×M2 block and the quantization parameter value associated with the M1×M2 block as inputs. Based on the inputs, k FIR filters, with k>1, can be selected from N pre-determined FIR filters and then a final FIR filter is generated as a weighted linear combination of the selected k FIR filters in some examples. Then, the final filter is applied to filter the N1×N2 neighborhood to generate the M1×M2 filtered output block. In an example, the number of unique filters that can be used for filtering is larger than N!/(k!·(N−k)!) and filter coefficients do not need to be encoded in the coded video bitstream. In an example, when N==−1000, k>1 and each weight for the linear combination has more than 2 bits, the number of unique filters for filtering is more than a million.

In the processing of image and/or video data, the image/video data is 2-dimensional and may include multiple channels. According to an aspect of the disclosure, using an MoE network for image and video processing, expert modules and gating network of the MoE network for image and/or video data can be configured to use convolution as the main operations.

Further, according to an aspect of the disclosure, in image and/or video coding, quantization parameter (QP) can be used to control the quality of the decoded image, and QP can be used in deciding how to filter a decoded image to improve picture quality. In a related art, QP is used to select one processing module from multiple processing modules (e.g., select one filter from multiple filters). In another related art, QP is used as an input to a single processing module, such as a single neural network, and the single neural network is trained to filter images of different QP values. In some embodiments of the present disclosure, QP value can be used to select multiple processing modules (e.g., multiple filters), and the selected processing modules process input image block, but not QP value in some examples.

Figure 12:
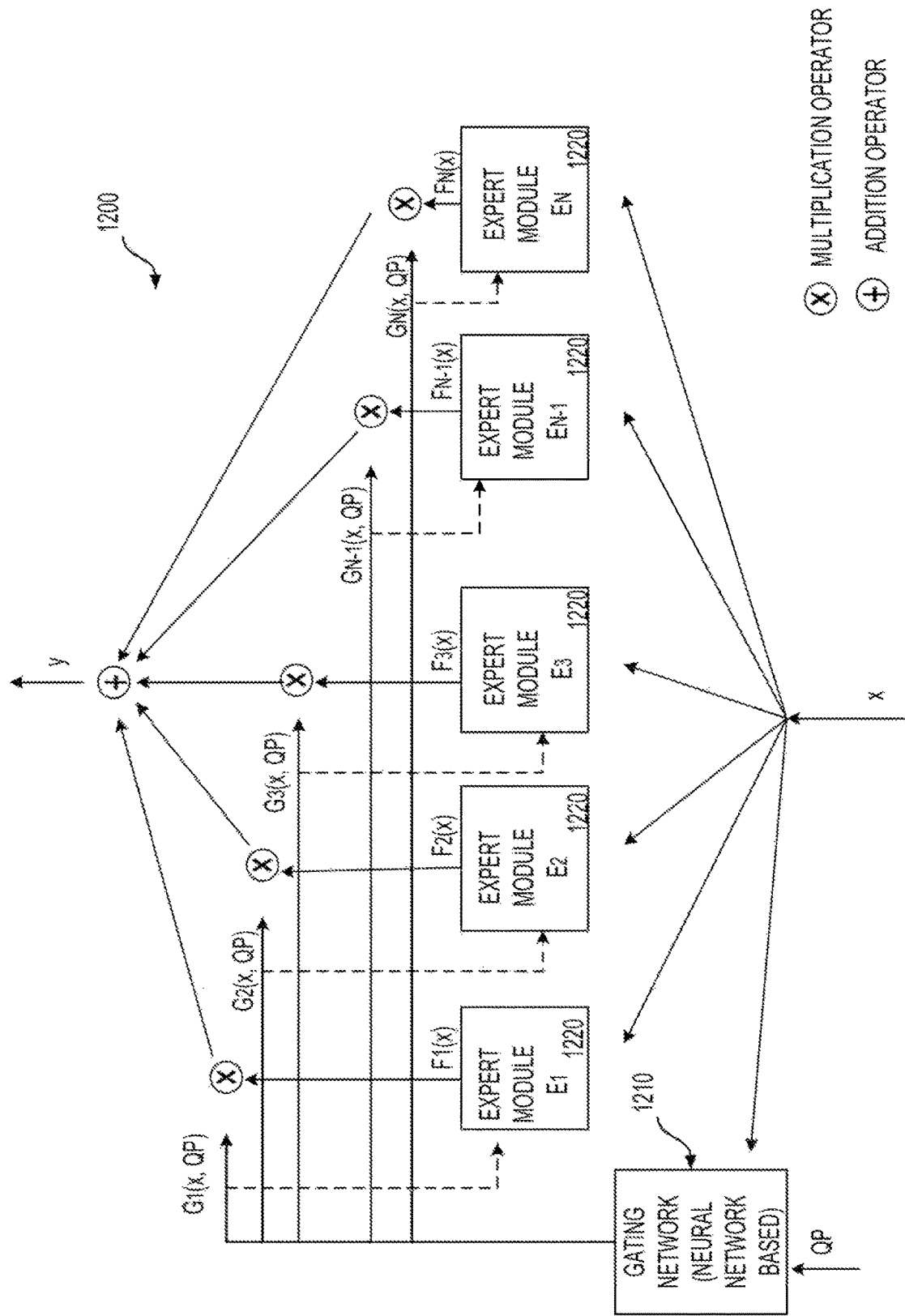
FIG. 12 shows an example of an adaptive MoE filter for image and/or video processing.

FIG. 12 shows an example of an adaptive MoE filter (1200) for image and/or video processing. The adaptive MoE filter (1200) includes a gating network (1210) and a plurality of expert modules (1220) shown by $E_1$-$E_N$, where N is the number of expert modules, and is a positive integer. The expert modules $E_1$-$E_N$ can have different parameters or different functions. The adaptive MoE filter (1200) receives an input block x that is a neighboring block of an image block, and a QP value. In some examples, the neighboring block includes the image block at a center position of the neighboring block and includes neighboring pixels of the image block. The image block is reconstructed based on the QP value. The adaptive MoE filter (1200) can generate a filtered image block y. The input block x and the QP value are provided to the gating network (1210). The gating network (1210) includes a convolution neural network that generates gating weights $G_1(x, QP)$-$G_N(x, QP)$ respectively for the expert modules $E_1$-$E_N$ based on the input block x and the QP value. The input block x is also provided to the expert modules $E_1$-$E_N$. In some examples, the expert modules $E_1$-$E_N$ are filters with different filtering functions or different filtering parameters. The expert modules $E_1$-$E_N$ can respectively generate intermediate filtering outputs (shown by $F_1(x)$-$F_N(x)$) based on the input block x. The filtered image block y is a weighted combination of the $F_1(x)$-$F_N(x)$ based on the gating weights $G_1(x, QP)$-$G_N(x, QP)$.

In the FIG. 12 example, the adaptive MoE filter (1200) receives 2-dimensional image data (e.g., neighboring block) as input and output filtered 2-dimensional image data (e.g., filtered image block). In some examples, convolutional neural networks are used in the expert modules $E_1$-$E_N$ (1220) and/or the gating network (1210). In some examples, the gating network (1210) can receive both an input block and QP value (that is used to reconstruct an image block at a center portion of the input block) as inputs, and the gating network (1210) uses a neural network structure instead of a matrix multiplication to combine the 2-dimensional image data (e.g., neighboring block) and a scalar value (e.g., QP value) to determine an N-dimensional vector (e.g., the gating weights $G_1(x, QP)$-$G_N(x, QP)$) for expert module activation and weighting.

In some examples, the gating weights $G_1(x, QP)$-$G_N(x, QP)$ are provided to the corresponding expert modules $E_1$-$E_N$ for activation. For example, when $G_1(x, QP)$ is non zero, the expert module $E_1$ is activated, and thus generates the intermediate filtering output $F_1(x)$. However, when $G_1(x, QP)$ is zero, the expert module $E_1$ is deactivated to save computation.

Figure 13:
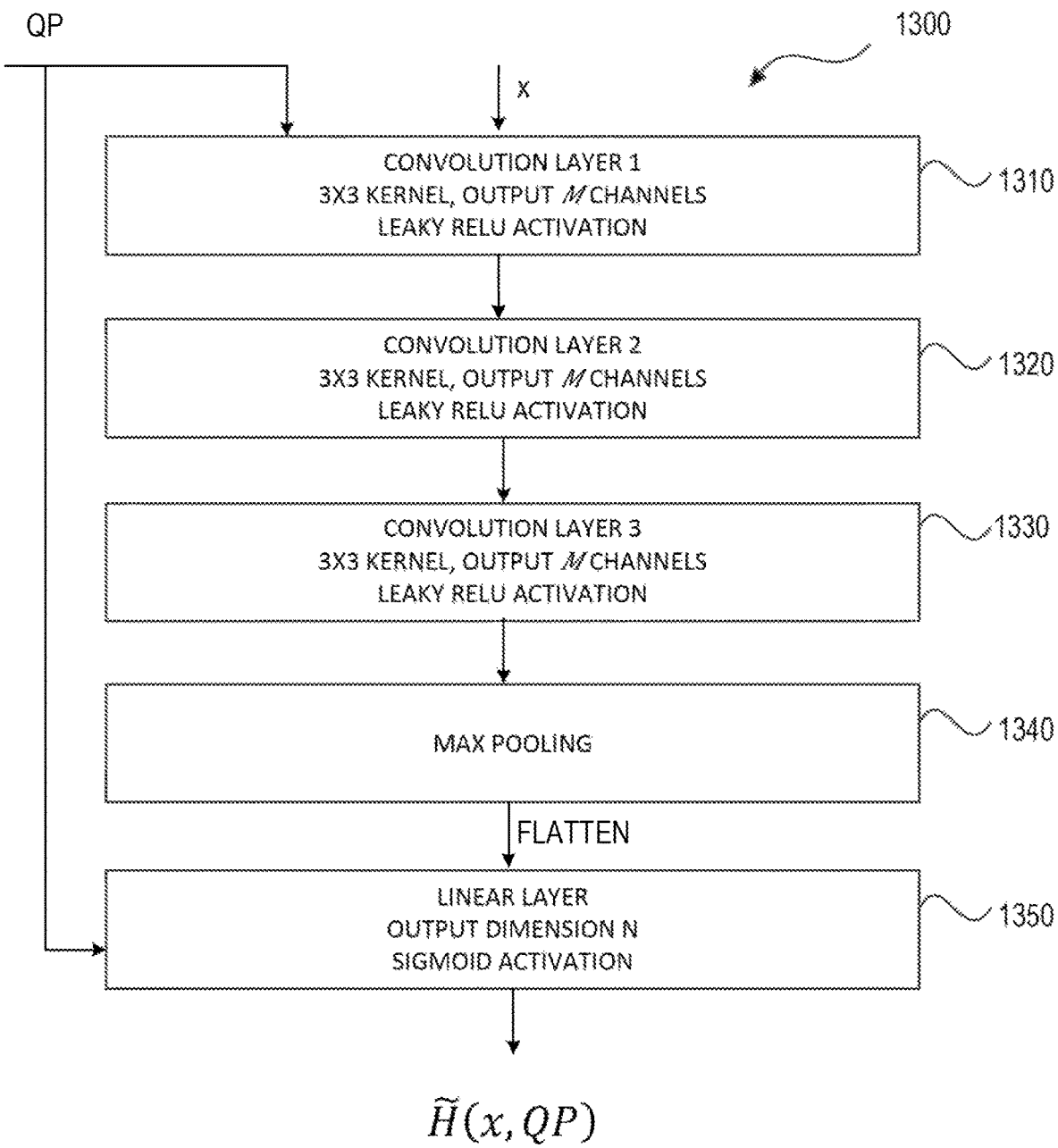
FIG. 13 shows an example of neural network structure in some examples.

FIG. 13 shows an example of neural network structure (1300) according to an embodiment of the disclosure. The neural network structure (1300) is based on a convolution neural network and can be used in the gating network (1210) in an example.

In the FIG. 13 example, the neural network structure (1300) includes three convolution layers (1310), (1320) and (1330), one max-pooling layer (1340), and one linear logistic regression layer (1350). In an example, the neural network structure (1300) receives 3-channel input block x (e.g., YUV channels) and QP value that is used to reconstruct a center portion of the 3-channel input block as inputs. The QP value is concatenated with the 3-channel input block to form a 4-channel input. The first convolution layer (1310) takes the 4-channel input and output a M-channel output, for example, M=32. The second and third convolution layers (1320) and (1330) both take a M-channel input and output a M-channel output. The M-channel output from the third convolution layer (1330) is also referred to as M-channel feature map. All convolution layers (1310), (1320) and (1330) can use a kernel size of 3×3 and are activated by the Leaky ReLU function. The max-pooling layer (1340) can take the M-channel feature map as input and down-sample the feature map through a max-pool operation using 2×2 kernel with a stride of 2 in an example. The resulting down-sampled feature map is flattened to a vector and concatenated with the QP value. This vector is given to the linear logistic regression layer (1350) to calculate an N-dimensional vector $\tilde{H}(x, QP)$.

Further, in an example, the gating network (1210) can determine a vector $G(x, QP)$ of N gating weights (e.g., $G_1(x, QP)$-$G_N(x, QP)$) in FIG. 12, N is the number of expert modules) using Eq. (5), Eq. (6) and Eq. (7). The vector $G(x, QP)$ is a sparse vector with k non-zero elements. If the element $G_i(x, QP)$ is non-zero, the corresponding expert module $E_i$ is activated, otherwise the element $G_i(x, QP)$ is zero and the corresponding expert module $E_i$ is not activated.

$$H(x, QP)_i = \tilde{H}(x, QP)_i + StandardNormal(\ ) \cdot Softplus\left(\left(\tilde{H}(x, QP) \cdot W_{noise}\right)_i\right) \quad \text{Eq. (5)}$$

$$G(x, QP) = Softmax(KeepTopK((H(x, QP), k)) \quad \text{Eq. (6)}$$

$$KeepTopK(v, k)_i = \begin{cases} v_i & \text{if } v_i \text{ is in the top } k \text{ elements of } v. \\ -\infty & \text{otherwise.} \end{cases} \quad \text{Eq. (7)}$$

According to an aspect of the disclosure, when the trainable matrix $W_{noise}$ is not zero, due to the random number generating function StandardNormal( ), $G(x, QP)$ in Eq. (6) is not deterministic. In some examples, the adaptive MoE filter (1200) with non deterministic parameters are only used for post processing, for example, in the post processing unit (930), otherwise using the adaptive MoE filter (1200) (with non deterministic parameters) in in loop filtering may cause reference pictures to be inconsistent at the encoder side and the decoder side and cause decoder errors and significant distortion. In some examples, the trainable matrix $W_{noise}$ can be forced to be zero, then $G(x, QP)$ becomes deterministic and the adaptive MoE filter (1200) can be used for in loop filtering. It is noted that when the adaptive MoE filter (1200) is used for in-loop filtering, $G(x, QP)$ is calculated using Eq. (7) and Eq. (8), where $\tilde{H}(x, QP)$ is the output from the neural network structure (1300):

$$G(x, QP) = Softmax(KeepTopK((\tilde{H}(x, QP), k)) \quad \text{Eq. (8)}$$

It is noted that the neural network structure (1300) can be modified to use different number of convolution layers, different number of intermediate channels, different activation functions. In an example, in addition to the one linear layer logistic regression, a multi-layer neural network can be used. The QP value can also be concatenated at any point (e.g., the second convolution layer (1320), the third convolution layer (1330), the max-pooling layer (1340)) in the gating network as input to any layer in the gating network.

In some examples, each of N expert modules includes a convolution layer with a L×L kernel with no output activation layer.

Figure 14:
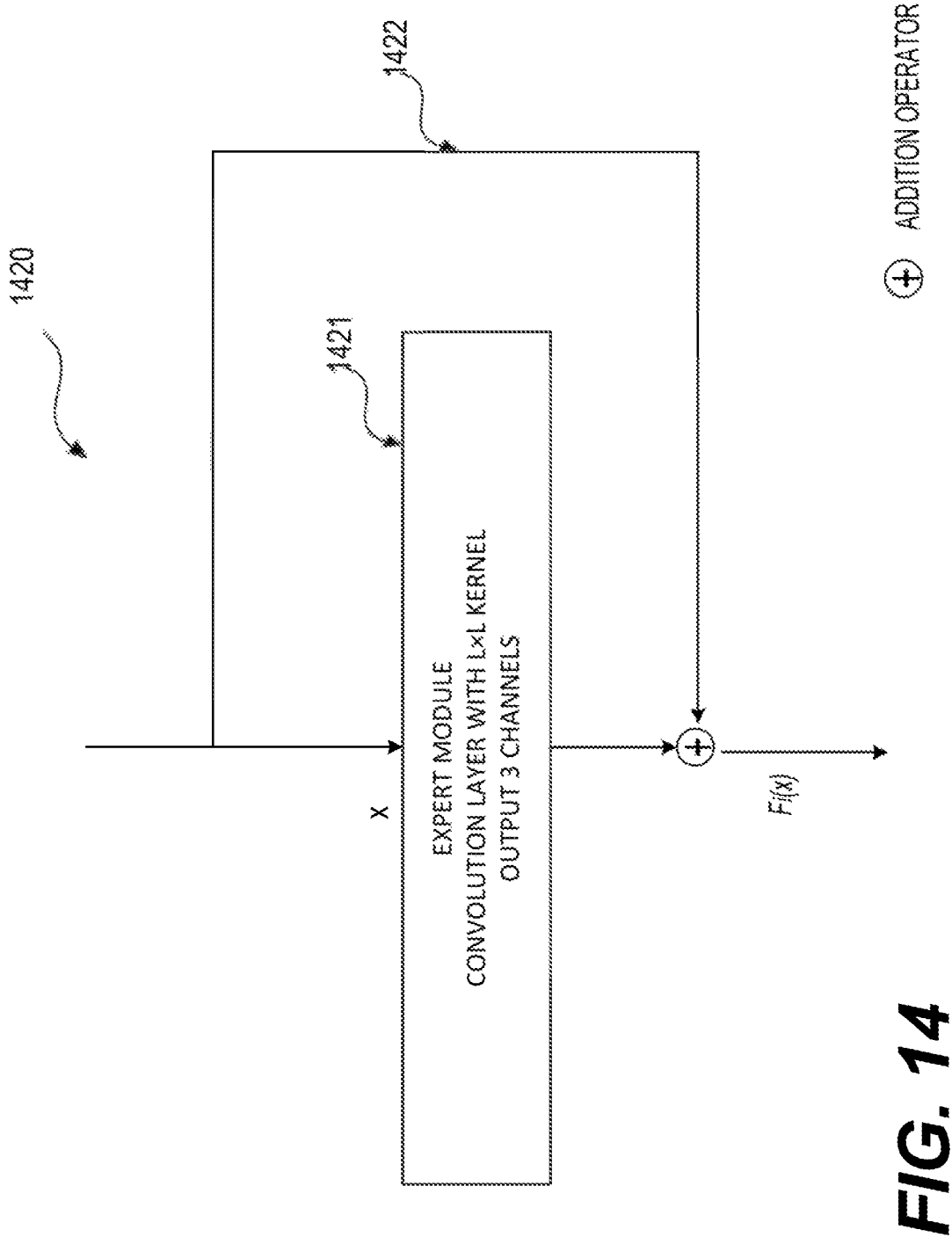
FIG. 14 shows a diagram of an expert module in some examples.

FIG. 14 shows a diagram of an expert module (1420) in some examples. In an example, the expert module (1420) can be used in the place of each of the expert module (1220). The expert module (1420) includes a convolution layer (1421). The expert module (1420) can receive input block x that can be a 3-channel input block x (e.g., a neighboring block of an image block with the image block at a center portion of the neighboring block) and filter the 3-channel input block x with the convolution layer (1421).

In an example, to ease a training process, a residual connection (1422) is used to add the input block to the output of the convolution layer (1421) to obtain $F_i(x)$ that is the module output of the expert module (1420). In an example, L is selected to be 7 to match the BALF filter size in VVC.

It is noted that in some examples, the residue connection (1422) can be removed.

In the FIG. 14 example, the expert module (1420) uses a convolutional layer to filter the input block. It is noted that the expert module (1420) can be modified to use different setups of convolution layers, such as multiple number convolutional layers with multiple intermediate channels, different sizes of convolution kernels, different activation functions, and options of using the residual connection.

Figure 15:
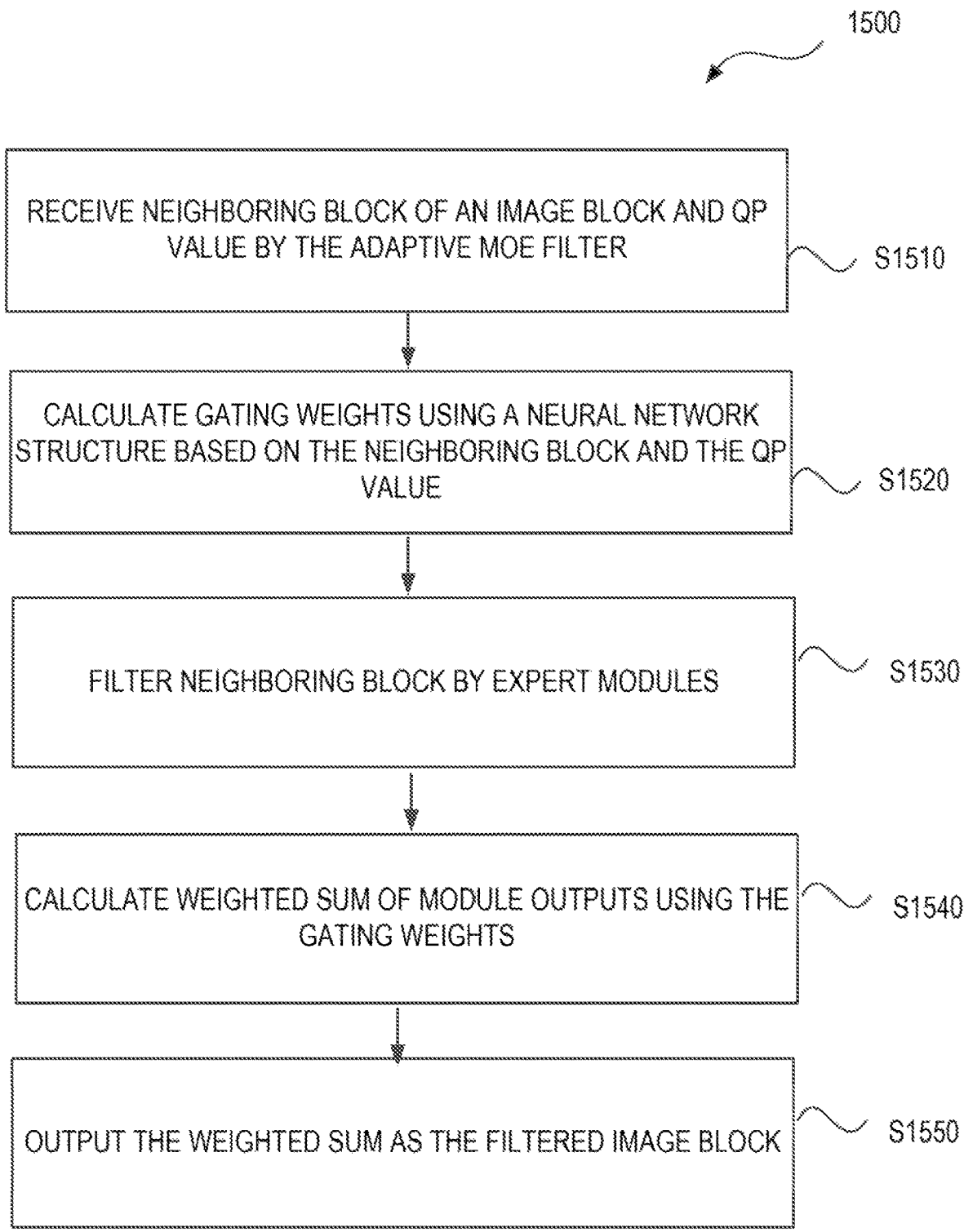
FIG. 15 shows a flow chart outlining a process for processing image data by an adaptive MoE filter in some examples.

FIG. 15 shows a flow chart outlining a process (1500) for processing image data by an adaptive MoE filter, such as the adaptive MoE filter (1200).

At (S1510), the adaptive MoE filter (1200) receives a neighboring block of an image block with the image block at a center portion of the neighboring block and a QP value that is used to reconstruct the image block. In an example, the adaptive MoE filter (1200) receives a $N_1 \times N_2$ block. The $N_1 \times N_2$ block includes a $M_1 \times M_2$ block and neighbouring pixels of the $M_1 \times M_2$ block. The adaptive MoE filter (1200) also receives QP value that is used in the reconstruction of the $M_1 \times M_2$ block.

At (S1520), the gating network (1210) calculates, using a neural network structure (e.g., neural network structure (1300)), respective gating weights for the expert modules $E_1$-$E_N$ based on the $N_1 \times N_2$ block and the QP value.

At (S1530), the neighboring block is filtered by the expert modules to generate module outputs. For example, an expert module, such as the expert module $E_1$ can operate on the $N_1 \times N_2$ block and generate a $M_1 \times M_2$ block accordingly as module output. In an example, when a gating weight corresponding to an expert module is non zero, the expert module is activated. The input block can be filtered by the activated expert modules. In another example, the input block can be filtered by all the expert modules.

At (S1540), a weighted sum of the module outputs from the expert modules is calculated based on the gating weights, such as according to Eq. (9):

$$y = \Sigma_{i=1}^{N} G_i(x, QP) F_i(x) \quad \text{Eq. (9)}$$

In an example, a weighted sum of module outputs from activated expert modules is calculated. In another example, a weighted sum of module outputs from all expert modules is calculated. When a gating weight for an expert module is zero, the module output is not included in the weighted sum.

At (S1550), the weighted sum is output as the filtered image block by the adaptive MoE filter (1200).

Figure 16:
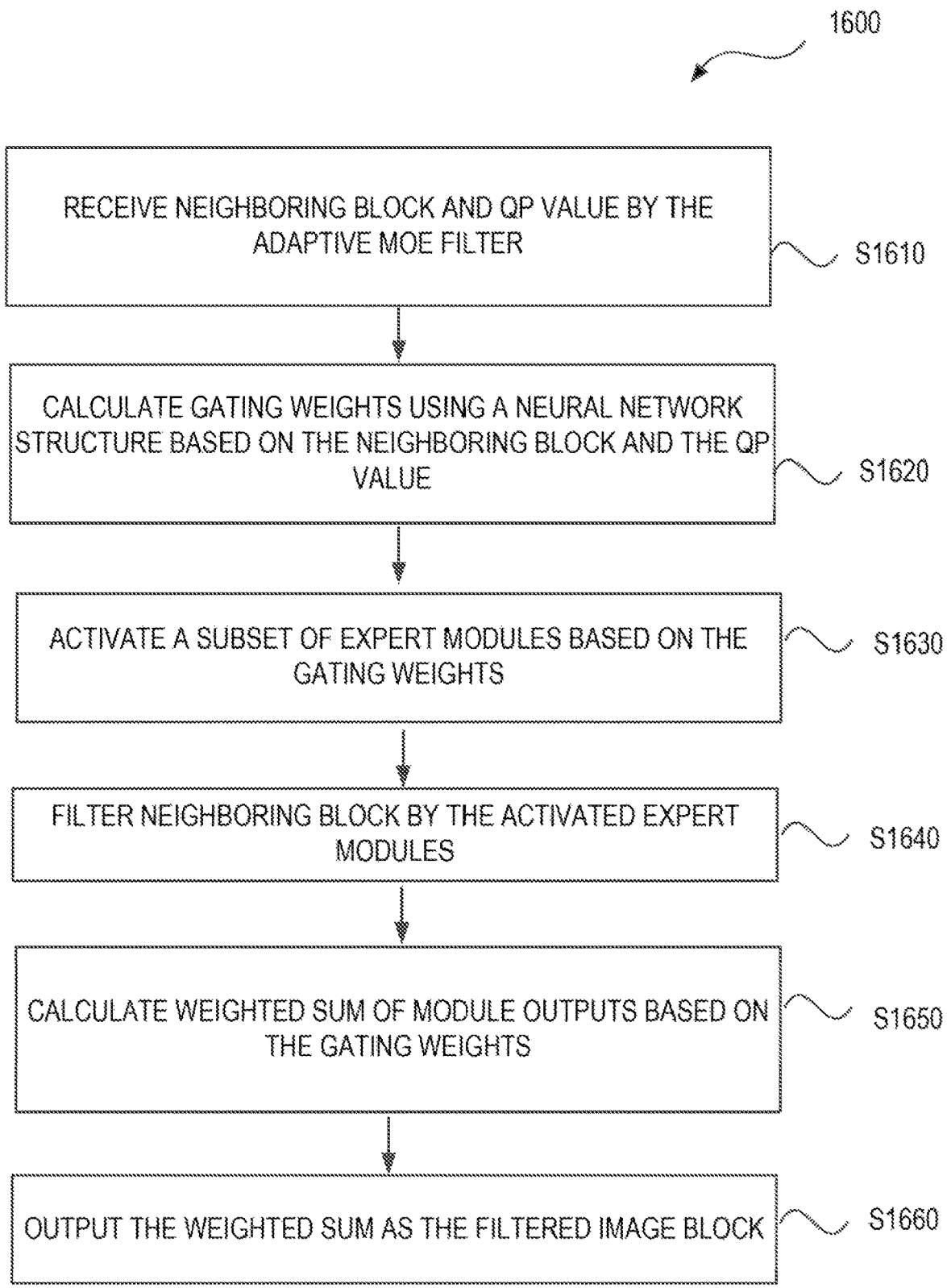
FIG. 16 shows another flow chart outlining a process for processing image data by an adaptive MoE filter

FIG. 16 shows another flow chart outlining a process (1600) for processing image data by an adaptive MoE filter, such as the adaptive MoE filter (1200).

At (S1610), the adaptive MoE filter (1200) receives a neighboring block of an image block with the image block at a center portion of the neighboring block and a QP value that is used to reconstruct the image block. In an example, the adaptive MoE filter (1200) receives a $N_1 \times N_2$ block. The $N_1 \times N_2$ block includes a $M_1 \times M_2$ block and neighbouring pixels of the $M_1 \times M_2$ block. The adaptive MoE filter (1200) also receives QP value that is used in the reconstruction of the $M_1 \times M_2$ block.

At (S1620), the gating network (1210) calculates, using a neural network structure (e.g., neural network structure (1300)), respective gating weights for the expert modules $E_1$-$E_N$ based on the $N_1 \times N_2$ block and the QP value.

At (S1630), a subset of the expert modules $E_1$-$E_N$ is activated based on the gating weights. In some examples, a subset of the expert modules $E_1$-$E_N$ with nonzero gating weights is activated, and the rest of the expert modules $E_1$-$E_N$ with zero gating weights is deactivated. In an example, the gating network (1210) is configured to output k non zero gating weights (k is an integer, k>1).

At (S1640), the neighboring block is filtered by the activated expert modules to generate module outputs. For example, an activated expert module can operate on the $N_1 \times N_2$ block and generate a $M_1 \times M_2$ block accordingly as module output. The neighboring block can be filtered by the activated expert modules.

At (S1650), a weighted sum of the module outputs from the activated expert modules is calculated based on the gating weights, such as according to Eq. (9).

At (S1660), the weighted sum is output as the filtered image block by the adaptive MoE filter (1200).

In some embodiments, the adaptive MoE filter is used as an in loop filter for noise reduction in video processing. In some examples, expert modules of the adaptive MoE filter can be configured as pre-defined filters for improving picture quality of an M1×M2 block. The adaptive MoE filter takes QP value and a N1×N2 block that includes a M1×M2 block and neighboring pixels of the M1×M2 block as inputs.

Based on the N1×N2 block and QP value, the adaptive MoE filter can select k expert modules from N pre-defined expert modules and compute weightings for the k expert modules, where k>1. The k expert modules can respectively compute module outputs. Each expert module outputs one M1×M2 block.

Then, the output of the adaptive MoE filter is computed as a linear combination of the module outputs of the k selected expert modules using the computed weighting of the k expert modules for the linear combination.

It is noted that, in some examples, although the weights from the gating network are functions of QP, the filter coefficients of the N pre-defined filters are not functions of QP.

In some embodiments, the expert modules are FIR filters. The FIR filters can be suitably combined.

Figure 17:
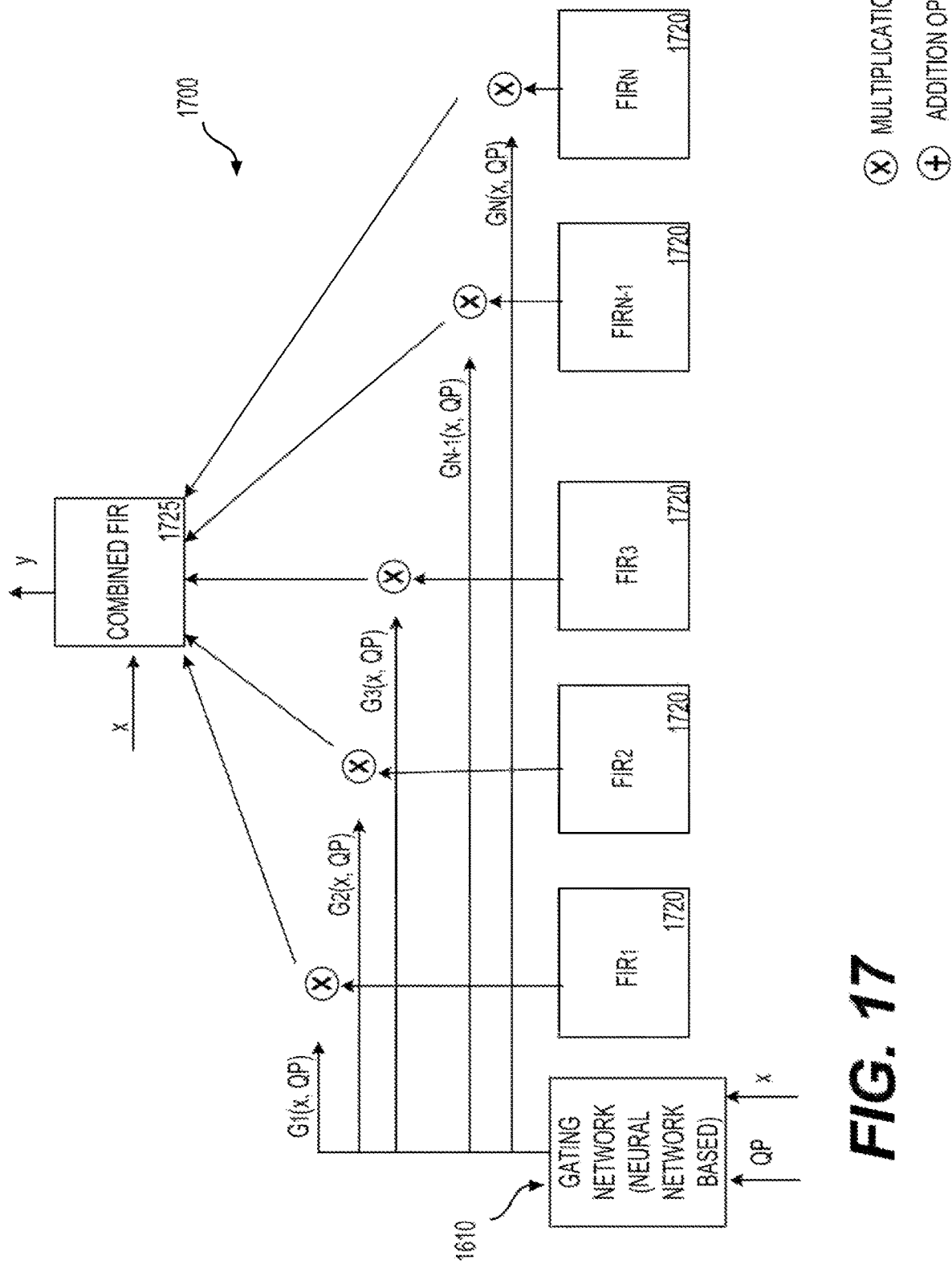
FIG. 17 shows an example of an adaptive MoE filter for image and/or video processing.

FIG. 17 shows an example of an adaptive MoE filter (1700) for image and/or video processing. The adaptive MoE filter (1700) includes a gating network (1710) and a plurality of expert modules (1720) that are implemented as predefined FIR filters shown by $FIR_1$-$FIR_N$ in FIG. 17, where N is the number of expert modules, and is a positive integer. The $FIR_1$-$FIR_N$ can have different parameters. The adaptive MoE filter (1700) receives a neighboring block x of an image block with the image block at a center portion of the neighboring block and a QP value that is used in reconstruction of the image block, and can generate a filtered image block y. The neighboring block x and the QP value are provided to the gating network (1710). The gating network (1710) includes a convolution neural network, such as the neural network structure (1300), and can generate gating weights $G_1(x, QP)$-$G_N(x, QP)$ respectively for the $FIR_1$-$FIR_N$ based on the neighboring block x and the QP value. In an example, among the gating weights $G_1(x, QP)$-$G_N(x, QP)$, k gating weights are non zero, and k is a positive integer greater than 1. Based on the gating weights $G_1(x, QP)$-$G_N(x, QP)$, a combined FIR filter (1725) is determined as a linear combination of the $FIR_1$-$FIR_N$ using the gating weights $G_1(x, QP)$-$G_N(x, QP)$ for the linear combination. Then, the neighboring block x is provided to the combined FIR filter (1725), and the combined FIR filter (1725) outputs a filtered image block y.

In an example, each of the $FIR_1$-$FIR_N$ is implemented with a convolution operation. Using the adaptive MoE filter (1700), one convolution operation is performed to generate the filtered image block y. For comparison, using the adaptive MoE filter (1200), in an example, k convolution operations are performed.

Figure 18:
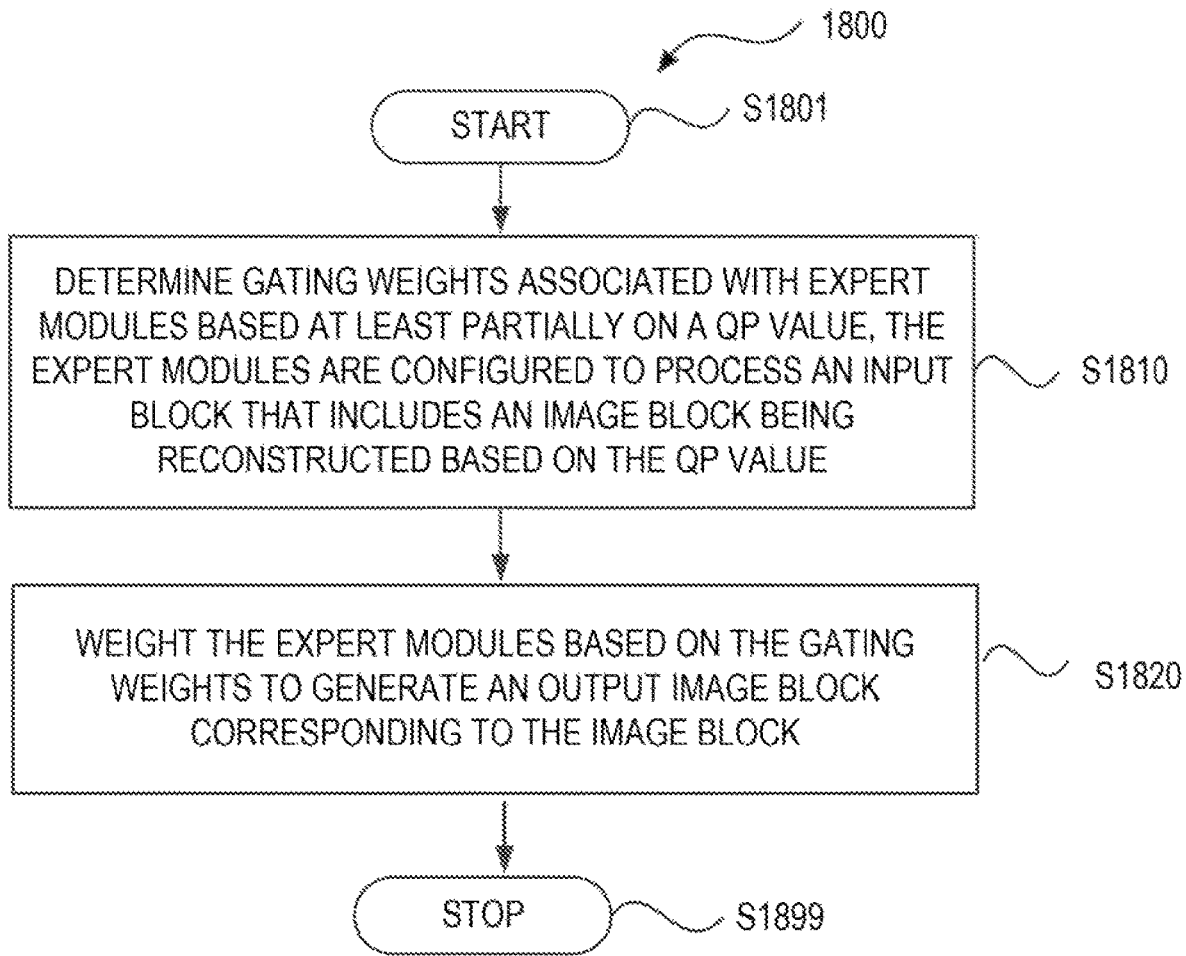
FIG. 18 shows a flow chart outlining a process example.

FIG. 18 shows a flow chart outlining a process (1800) according to an embodiment of the disclosure. The process (1800) can be used in neural network processing, such as in a neural network based filter in a video codec. In various embodiments, the process (1800) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1800) is implemented in software instructions, thus when the processing circuitry executes the software instructions, the processing circuitry performs the process (1800). The process starts at (S1801) and proceeds to (S1810).

At (S1810), gating weights associated with expert modules are determined based at least partially on a quantization parameter (QP) value. The expert modules are configured to process an input block including an image block that is reconstructed based on the QP value.

In some examples, the gating weights are determined based on the quantization parameter and the input block that includes the image block and neighboring pixels of the image block. In some example, the gating weights are determined using at least a convolution neural network layer.

At (S1820), the expert modules are weighted based on the gating weights to generate an output image block corresponding to the image block.

In some examples, module outputs from the expert modules are combined based on the gating weights to generate the output image block corresponding the image block.

In some examples, a combined expert module that combines the expert modules can be determined based on the gating weights. In an example, the expert modules are finite impulse response (FIR) filters. Then, a combined FIR filter that combines the FIR filters based on the gating weights can be determined. The combined FIR filter is applied on the input block that includes the image block to generate the output image block.

In some examples, a subset of expert modules with non zero gating weights is activated. Then, module outputs of the subset of expert modules are combined based on the gating weights associated with the subset of expert modules to generate the output image block corresponding to the image block.

In some examples, the gating weights are determined in a deterministic manner. The output image block can be generated in a loop associated with reference pictures.

In some examples, the gating weights are determined in a non deterministic manner. The output image block is generated out of a loop associated with reference pictures.

In some examples, the expert modules can respectively include a convolution neural network that generates the module output in response to the input block that includes the image block.

Then, the process proceeds to (S1899).

It is noted that various units, blocks and modules in the above description can be implemented by various technologies, such as, processing circuitry, processor executing software instructions, a combination of hardware and software, and the like.

The techniques described above, can be implemented as computer software using computer-readable instructions and physically stored in one or more computer-readable media. For example, FIG. 19 shows a computer system (1900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 19:
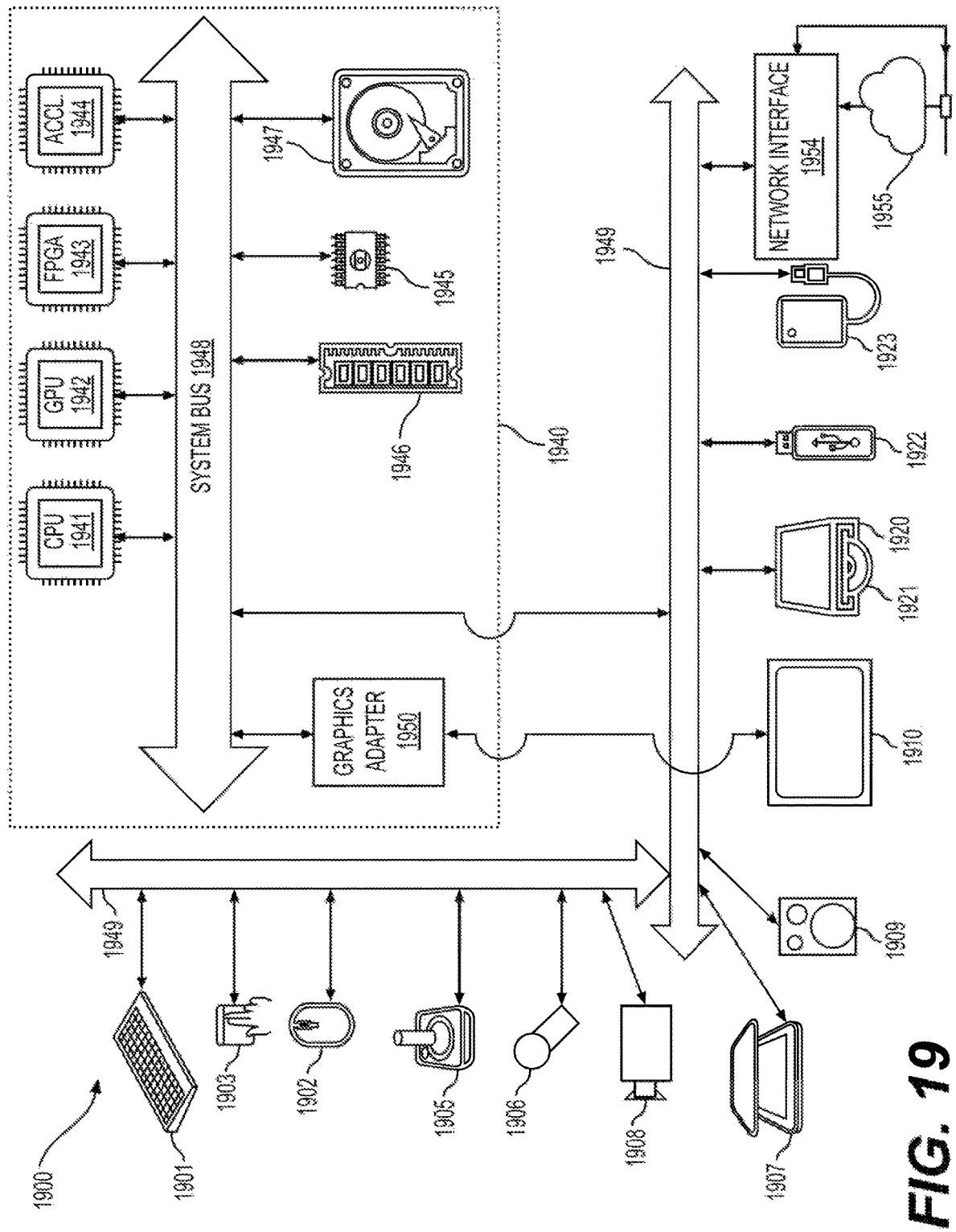
FIG. 19 is a schematic illustration of a computer system in accordance with an embodiment.

The components shown in FIG. 19 for computer system (1900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1900).

Computer system (1900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1901), mouse (1902), trackpad (1903), touch screen (1910), data-glove (not shown), joystick (1905), microphone (1906), scanner (1907), camera (1908).

Computer system (1900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1910), data-glove (not shown), or joystick (1905), but there can also be tactile feedback devices that do not serve as input devices), audio output devices (such as: speakers (1909), headphones (not depicted)), visual output devices (such as screens (1910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1900) can also include human accessible storage devices and their associated media such as optical media including CD/DVD ROM/RW (1920) with CD/DVD or the like media (1921), thumb-drive (1922), removable hard drive or solid state drive (1923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1900) can also include an interface (1954) to one or more communication networks (1955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1949) (such as, for example USB ports of the computer system (1900)); others are commonly integrated into the core of the computer system (1900) by attachment to a system bus as described below (for example Ethernet interface into a PC computer system or cellular network interface into a smartphone computer system). Using any of these networks, computer system (1900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1940) of the computer system (1900).

The core (1940) can include one or more Central Processing Units (CPU) (1941), Graphics Processing Units (GPU) (1942), specialized programmable processing units in the form of Field Programmable Gate Areas (FPGA) (1943), hardware accelerators for certain tasks (1944), graphics adapters (1950), and so forth. These devices, along with Read-only memory (ROM) (1945), Random-access memory (1946), internal mass storage such as internal non-user accessible hard drives, SSDs, and the like (1947), may be connected through a system bus (1948). In some computer systems, the system bus (1948) can be accessible in the form of one or more physical plugs to enable extensions by additional CPUs, GPU, and the like. The peripheral devices can be attached either directly to the core's system bus (1948), or through a peripheral bus (1949). In an example, the screen (1910) can be connected to the graphics adapter (1950). Architectures for a peripheral bus include PCI, USB, and the like.

CPUs (1941), GPUs (1942), FPGAs (1943), and accelerators (1944) can execute certain instructions that, in combination, can make up the aforementioned computer code. That computer code can be stored in ROM (1945) or RAM (1946). Transitional data can be also be stored in RAM (1946), whereas permanent data can be stored for example, in the internal mass storage (1947). Fast storage and retrieve to any of the memory devices can be enabled through the use of cache memory, that can be closely associated with one or more CPU (1941), GPU (1942), mass storage (1947), ROM (1945). RAM (1946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1900), and specifically the core (1940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1940) that are of non-transitory nature, such as core-internal mass storage (1947) or ROM (1945). The software implementing various embodiments of the present disclosure can be stored in such devices and executed by core (1940). A computer-readable medium can include one or more memory devices or chips, according to particular needs. The software can cause the core (1940) and specifically the processors therein (including CPU, GPU, FPGA, and the like) to execute particular processes or particular parts of particular processes described herein, including defining data structures stored in RAM (1946) and modifying such data structures according to the processes defined by the software. In addition or as an alternative, the computer system can provide functionality as a result of logic hardwired or otherwise embodied in a circuit (for example: accelerator (1944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video processing, comprising:
    determining, by processing circuitry, respective gating weights each associated with a corresponding one of expert modules, each gating weight for a corresponding expert module is determined based on (i) a quantization parameter (QP) value and (ii) a neighboring block of an image block, each of the expert modules being configured to apply at least one of a filtering operation or a convolution operation to an input block that includes the image block being reconstructed based on the QP value; and
    weighting, by the processing circuitry, the expert modules based on the gating weights by activating expert modules having non-zero gating weights to apply the at least one of the filtering operation or the convolution operation to the input block to generate an output image block corresponding to the image block.

2. The method of claim 1, further comprising:
    combining, by the processing circuitry, module outputs from the expert modules based on the gating weights to generate the output image block corresponding the image block.

3. The method of claim 1, further comprising:
    determining, by the processing circuitry, a combined expert module that combines the expert modules based on the gating weights.

4. The method of claim 1, further comprising:
    determining the gating weights based on the quantization parameter and the input block that includes the image block and the neighboring block pixels of the image block.

5. The method of claim 1, further comprising:
    determining the gating weights using at least a convolution neural network layer.

6. The method of claim 1, further comprising:
    combining module outputs of the expert modules having the non-zero gating weights to generate the output image block corresponding to the image block.

7. The method of claim 1, further comprising:
    generating, by an expert module with a convolution neural network, a module output in response to the input block that includes the image block.

8. The method of claim 1, wherein the expert modules are finite impulse response (FIR) filters, and the method further comprises:
    determining a combined FIR filter that combines the FIR filters based on the gating weights; and
    applying, the combined FIR filter on the input block that includes the image block to generate the output image block.

9. The method of claim 1, further comprising:
    determining the gating weights in a deterministic manner, the output image block being generated in a loop associated with reference pictures.

10. The method of claim 1, further comprising:
    determining the gating weights in a non deterministic manner, the output image block being generated out of a loop associated with reference pictures.

11. An apparatus for video processing, comprising processing circuitry configured to:
    determine respective gating weights each associated with a corresponding one of expert modules, each gating weight for a corresponding expert module is determined based on (i) a quantization parameter (QP) value and (ii) a neighboring block of an image block, each of the expert modules being configured to apply at least one of a filtering operation or a convolution operation to an input block that includes the image block being reconstructed based on the QP value; and
    weight the expert modules based on the gating weights by activating expert modules having non-zero gating weights to apply the at least one of the filtering operation or the convolution operation to the input block to generate an output image block corresponding to the image block.

12. The apparatus of claim 11, wherein the processing circuitry is further configured to:
    combine module outputs from the expert modules based on the gating weights to generate the output image block corresponding the image block.

13. The apparatus of claim 11, wherein the processing circuitry is further configured to:
    determine a combined expert module that combines the expert modules based on the gating weights.

14. The apparatus of claim 11, wherein the processing circuitry is further configured to:
    determine the gating weights based on the quantization parameter and the input block that includes the image block and the neighboring block of the image block.

15. The apparatus of claim 11, wherein the processing circuitry is further configured to:
    determine the gating weights using at least a convolution neural network layer.

16. The apparatus of claim 11, wherein the processing circuitry is further configured to:
    combine module outputs of the expert modules having the non-zero gating weights to generate the output image block corresponding to the image block.

17. The apparatus of claim 11, wherein the processing circuitry is further configured to:
    generate, by an expert module with a convolution neural network, a module output in response to the input block that includes the image block.

18. The apparatus of claim 11, wherein the expert modules are finite impulse response (FIR) filters, and the processing circuitry is further configured to:
    determine a combined FIR filter that combines the FIR filters based on the gating weights; and
    apply the combined FIR filter on the input block that includes the image block to generate the output image block.

19. The apparatus of claim 11, wherein the processing circuitry is further configured to:
    determine the gating weights in a deterministic manner, the output image block being generated in a loop associated with reference pictures.

20. The apparatus of claim 11, wherein the processing circuitry is further configured to:
    determine the gating weights in a non deterministic manner, the output image block being generated out of a loop associated with reference pictures.

* * * * *